(12) United States Patent
Bae et al.

(10) Patent No.: US 7,859,955 B2
(45) Date of Patent: Dec. 28, 2010

(54) APPARATUS FOR RECORDING/REPRODUCING HOLOGRAPHIC DATA AND METHOD OF ADJUSTING POSITION OF RECORDING LAYER

(75) Inventors: Jae-cheol Bae, Suwon-si (KR); In-joo Kim, Suwon-si (KR); Young-jae Park, Yongin-si (KR); Taek-seong Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/548,653

(22) Filed: Aug. 27, 2009

(65) Prior Publication Data
US 2010/0053710 A1  Mar. 4, 2010

(30) Foreign Application Priority Data
Aug. 28, 2008  (KR) .................. 10-2008-0084741

(51) Int. Cl.
G11B 7/00  (2006.01)
(52) U.S. Cl. .................. 369/44.41; 369/103; 369/120
(58) Field of Classification Search .................. None
See application file for complete search history.

(56) References Cited

U.S. PATENT DOCUMENTS

| 6,574,174 | B1  | 6/2003 | Amble et al. |       |
|-----------|-----|--------|--------------|-------|
| 7,724,409 | B2* | 5/2010 | Lin et al. ....................... | 359/22 |
| 2007/0047419 | A1* | 3/2007 | Usami ......................... | 369/103 |
| 2007/0047421 | A1* | 3/2007 | Usami ......................... | 369/103 |
| 2007/0146836 | A1  | 6/2007 | Fukushima et al. | |
| 2007/0230292 | A1* | 10/2007 | Yamamoto et al. ....... | 369/44.26 |

FOREIGN PATENT DOCUMENTS

| EP | 1 411 508 | 4/2004 |
| EP | 1 926 092 | 5/2008 |
| EP | 1 986 187 | 10/2008 |
| EP | 2 063 426 | 5/2009 |
| WO | WO 2007/094456 | 8/2007 |
| WO | WO 2008/032865 | 3/2008 |

OTHER PUBLICATIONS

European Search Report Issued on Dec. 14, 2009, in corresponding European Application No. 09168928.1 (9 pages).

* cited by examiner

*Primary Examiner*—Joseph Haley
(74) *Attorney, Agent, or Firm*—NSIP Law

(57) ABSTRACT

An apparatus for recording/reproducing holographic data and a method of adjusting a position of a recording layer. While an objective lens focusing first and second lights having different wavelengths on a holographic data storage medium including first and second reflective layers reciprocatingly moves in a direction of an optical axis, a focus movement unit, which moves a focus of the second light in the direction of the optical axis until a time difference between a first detection signal generated when the first light is reflected from the first reflective layer and a second detection signal generated when the second light is reflected from the second reflective layer becomes a value corresponding to a position of a desired recording layer, is controlled to move a focal position of the second light so that the focal position of the second light can be adjusted to the position of a desired recording layer.

17 Claims, 12 Drawing Sheets

APPARATUS FOR RECORDING/REPRODUCING HOLOGRAPHIC DATA AND METHOD OF ADJUSTING POSITION OF RECORDING LAYER

CROSS-REFERENCE TO RELATED APPLICATION

This application claims the benefit of Korean Application No. 10-2008-0084741, filed in the Korean Intellectual Property Office on Aug. 28, 2008, the disclosure of which is incorporated herein by reference.

BACKGROUND OF THE INVENTION

1. Field of the Invention

Aspects of the present invention relate to a holographic data storage device, and more particularly, to an apparatus for recording/reproducing holographic data and a method of adjusting a position of a recording layer, by which an initial position of the recording layer and a position of a desired recording layer can be effectively adjusted during recording.

2. Description of the Related Art

Technology for storing information using holograms is widely used. In such technology, information is stored in an optical interference pattern in an inorganic crystal that is sensitive to light or in a material that reacts according to intensity of light, such as a photo polymer. Optical interference patterns are formed using two coherent laser beams. In other words, interference patterns are formed when a reference light and a signal light having different paths interfere with each other, thereby causing chemical or physical changes in a photosensitive information storage medium and are recorded thereon. A reference light similar to light used to record information is irradiated on interference patterns recorded on the information storage medium so as to reproduce information from the recorded interference patterns. This causes diffraction due to the interference patterns. The signal light is restored and information is reproduced.

Examples of technology for storing information using holograms include a volume holography method by which information is recorded/reproduced in one page units using volume holography, and a micro-holography method by which information is recorded/reproduced in single bit units by using micro-holography. In the volume holography method, a large amount of information can be processed simultaneously. However, since an optical system should be very precisely adjusted, it is not easy to adopt this method in consumer devices.

In the micro-holography method, two condensed light beams interfere with each other at a focal point and thus form fine interference patterns (micro-hologram). Positions on which the interference patterns are formed are moved on a plane of an information storage medium, so that a plurality of interference patterns are recorded on the information storage medium to form a plurality of recording layers. The recording layers are superimposed in a depth direction of the information storage medium to form a multi-layer structure so that information can be recorded three-dimensionally on the information storage medium.

In the micro-holography method, information is recorded in a plurality of recording layers in the depth direction of the information storage medium, thereby increasing a recording capacity of the information storage medium. In a multi-layer optical disc, such as a Blu-ray disc (BD), a reflective layer exists in each of the recording layers, and the plurality of recording layers are discriminated according to a level of the intensity signal of reflected light and the polarity of the signal, and an optical focus is formed in a desired recording layer.

However, in the information storage medium used in the micro-holography method, a reflective layer does not exist in each of the recording layers unlike in existing optical discs. When a reflective layer exists in each of the recording layers in the holographic information storage medium, efficiency of recorded light is degraded due to the reflective layer. Thus, a plurality of layers cannot be recorded in the depth direction of the information storage medium, and a recording capacity may not be increased.

Thus, in the information storage medium used in the micro-holography method, a reflective layer does not exist in each of the recording layers. As such, it is not easy to form an optical focus in a desired recording layer of the information storage medium. When an optical focus is not formed on the desired recording layer, a distance between the recording layers may not be uniform. As a result, crosstalk between adjacent layers may not be uniform, and the performance of a reproduction signal in each of the recording layers may be different. Furthermore, the optical focus may be formed in a portion that is far away from the recording layers, and recording may not be appropriately performed even when recording starts.

SUMMARY OF THE INVENTION

Aspects of the present invention provide an apparatus for recording/reproducing holographic data and a method of adjusting a position of a recording layer, by which a position of an initial recording layer and a position of a desired recording layer can be effectively adjusted using a light signal reflected from a holographic data storage medium during recording.

According to an aspect of the present invention, an apparatus for recording/reproducing holographic data is provided, in which a position of a recording layer in a holographic data storage medium is adjusted. The holographic data storage medium includes a substrate, a first reflective layer from which a first light having a first wavelength is reflected, a second reflective layer from which a second light having a second wavelength is reflected, and a holographic medium layer on which holographic data is recorded, wherein the second reflective layer is adjacent to the holographic medium layer, and the first reflective layer is disposed to be closer to or farther away from a side on which light is incident, than the second reflective layer, and a reflective layer of the first and second reflective layers that is disposed to be close to the side on which light is incident, of the first and second reflective layers is a transreflective layer through which light having one wavelength of the first and second lights having the first and second wavelengths, is transmitted and from which light having another wavelength, is reflected. The apparatus includes first and second light sources to emit the first and second lights, respectively; an objective lens to condense the first and second lights on the holographic data storage medium; a driving unit to drive the objective lens; a focus movement unit to move a focus of the second light in a direction of an optical axis; a first photodetector to detect the first light reflected from the holographic data storage medium and to generate a first detection signal; a second photodetector to detect the second light reflected from the holographic data storage medium and to generate a second detection signal; and a controller to control the apparatus for recording/reproducing holographic data to adjust a focal position of the second light in the holographic medium layer based on the first light.

According to another aspect of the present invention, the controller may control the focus movement unit to move a focal position of the second light so that the focal position of the second light is adjusted to the position of a desired recording layer while the objective lens reciprocatingly moves in a direction of an optical axis, and the focus movement unit moves a focus of the second light in the direction of the optical axis until a time difference between the time at which a first detection signal is generated when the first light is reflected from the first reflective layer and the time at which a second detection signal is generated when the second light is reflected from the second reflective layer equates to a value corresponding to a position of a desired recording layer.

According to another aspect of the present invention, the time difference between the times at which the first and second detection signals are generated may correspond to difference between a first time interval ts and a second time interval tr; the first time interval is a time interval between the generation of the first detection signal of the first light reflected from the surface of the holographic data storage medium and the first reflective layer; and the second time interval is a time interval in the generation of the second detection signal of the second light reflected from the second reflective layer based on the first detection signal of the first light reflected from the surface of the holographic data storage medium.

According to another aspect of the present invention, the time difference between the times at which the first and second detection signals are generated may be obtained by correcting an error caused by spherical aberration of the first detection signal generated from the surface of the holographic data storage medium and an error caused by spherical aberration of the second detection signal generated according to a degree by which a desired recording position deviates from the second reflective layer.

According to another aspect of the invention, when an error caused by spherical aberration of the first detection signal generated from the surface of the holographic data storage medium is zr and an error caused by spherical aberration due to separation between a focal position of the second light and the second reflective layer is zb, a time interval tsc between the first detection signal, which is obtained by correcting the error caused by spherical aberration satisfies tsc=ts+zr, and a time interval trc between the second detection signal, which is obtained by correcting the error caused by spherical aberration, based on the first detection signal of the first light reflected from the surface of the holographic data storage medium satisfies trc=tr+zr+zb, wherein zb,zr=−2 W40/NA2 Vact, where W40 is a spherical aberration coefficient, Vact is a proceeding speed when the objective lens reciprocatingly moves, and NA is a numerical aperture of the objective lens.

According to another aspect of the present invention, while the objective lens reciprocatingly moves in the direction of the optical axis, the controller controls the focus movement unit such that the focus movement unit moves the focus of the second light in the direction of the optical axis until a position of the first detection signal of the first light reflected from the first reflective layer is the same as a position of a second detection signal based on the second light reflected from the second reflective layer to move a focal position of the second light, the controller sets a reference position of the focus movement unit as a position at which the position of the first detection signal of the first light reflected from the first reflective layer is the same as the position of the second detection signal based on the second light reflected from the second reflective layer, the controller controls the first light to be focused on the first reflective layer via the objective lens, the controller controls the focus movement unit to move by displacement from the reference position such that the focus of the second light is moved in the direction of the optical axis so that the focal position of the second light is adjusted to a desired position.

According to another aspect of the present invention, the displacement of the focus movement unit is in proportion to the amount of focus movement of the second light.

According to another aspect of the present invention, the first and second photodetectors include a plurality of light-receiving regions, the first detection signal is a sum signal or a focus error signal of light-receiving signals of the first light detected by the first photodetector, and the second detection signal is a sum signal or a focus error signal of light-receiving signals of the second light detected by the second photodetector.

According to another aspect of the present invention, one light source of the first and second light sources emits a servo light, and the other light source emits light used to record or reproduce holographic data.

According to another aspect of the present invention, while the apparatus operates in a recording mode, a signal light and a reference light are divided from light emitted from the other light source, the signal light is reflected from the second or first reflective layer, is focused at a focus, and the reference light is directly focused at the focus, thereby forming fine interference patterns and recording holographic data; and while the apparatus operates in a reproduction mode, a hologram recorded in the holographic medium layer is reproduced based on light emitted from the other light source.

According to another aspect of the present invention, while the apparatus operates In the recording mode, the signal light and the reference light are incident on the holographic data storage medium in first and second orthogonal circular polarization states; the second reflective layer or the first reflective layer has a circular polarization separation function; a signal light in the first circular polarization state is reflected from the second or first reflective layer; and the reference light in the second circular polarization state is reflected in a partial region of the holographic data storage medium, or a portion of the reference light in the second circular polarization is reflected from overall regions of the holographic data storage medium.

According to another aspect of the present invention, a method of adjusting a position of a recording layer in a holographic data storage medium is provided. The holographic data storage medium includes a substrate, a first reflective layer from which a first light having a first wavelength is reflected, a second reflective layer from which a second light having a second wavelength is reflected, and a holographic medium layer on which holographic data is recorded, wherein the second reflective layer is adjacent to the holographic medium layer, the first reflective layer is disposed to be closer to or farther away from a side on which light is incident, than the second reflective layer, and a reflective layer that is disposed to be closer to the side of the first and second reflective layers on which light is incident is a transreflective layer through which light having one wavelength of the first and second lights having the first and second wavelengths is transmitted and from which light having another wavelength is reflected. The method includes adjusting a focal position of the second light according to a first detection signal of a first light reflected from the first reflective layer and a second detection signal of a second light reflected from the second reflective layer.

According to another aspect of the present invention, the method further includes controlling the focus movement unit to move a focus of the second light so that the focal position of the second light is adjusted to the position of a desired recording layer while an objective lens focusing the first and second lights on the holographic data storage medium makes a reciprocating motion in a direction of an optical axis, wherein the focus movement unit moves a focus of the second light in the direction of the optical axis until a time difference between a time at which a first detection signal is generated when the first light is reflected from the first reflective layer and a time at which a second detection signal is generated when the second light is reflected from the second reflective layer equates to a value corresponding to a position of a desired recording layer.

According to another aspect of the present invention, the method may further include: while the objective lens reciprocatingly moves in the direction of the optical axis, controlling the focus movement unit to move a focal position of the second light until a position of the first detection signal of the first light reflected from the first reflective layer is the same as a position of a second detection signal based on the second light reflected from the second reflective layer; setting a position at which the position of the first detection signal of the first light reflected from the first reflective layer is the same as the position of the second detection signal based on the second light reflected from the second reflective layer, as a reference position of the focus movement unit; and focusing the first light on the first reflective layer via the objective lens, moving the focus movement unit by displacement from the reference position and moving the focus of the second light in the direction of the optical axis to be adjusted to a desired position.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
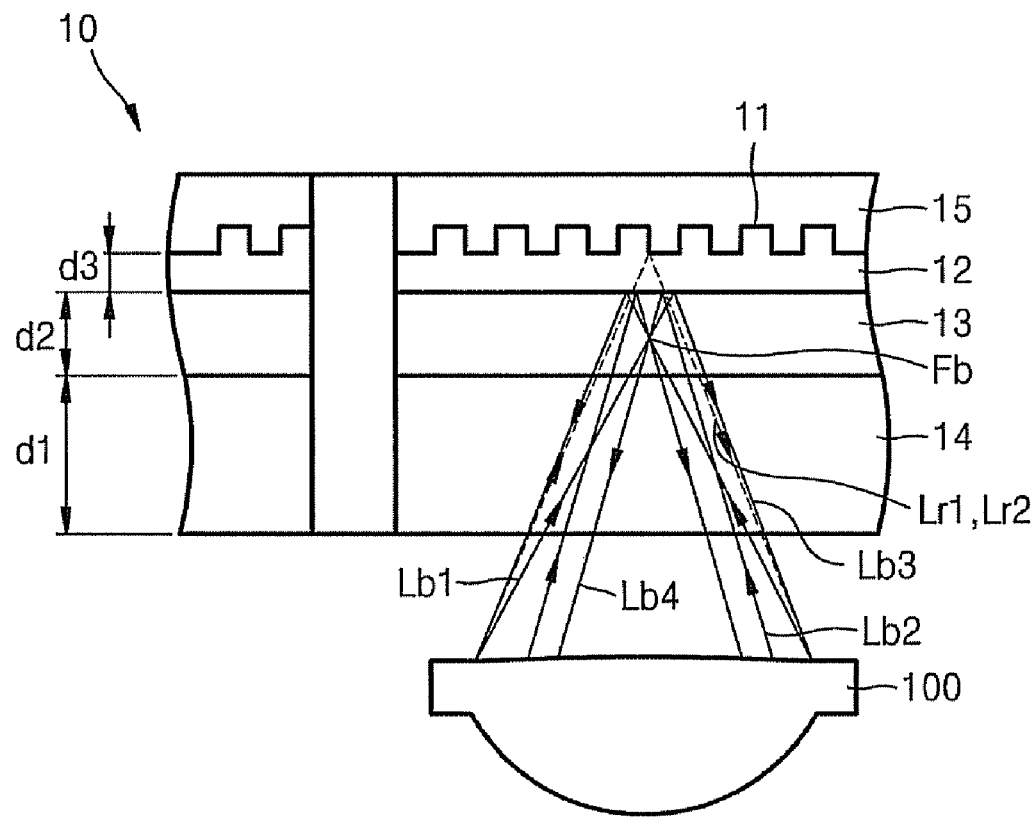
FIG. 1 illustrates a reflection type holographic data storage medium that can be used in an apparatus for recording/reproducing holographic data, according to an embodiment of the present invention.

Reference will now be made in detail to the present embodiments of the present invention, examples of which are illustrated in the accompanying drawings, wherein like reference numerals refer to the like elements throughout. The embodiments are described below in order to explain aspects of the present invention by referring to the figures.

The holographic data storage medium used in the apparatus for recording/reproducing holographic data according to an embodiment of the includes a substrate, a first reflective layer from which a first light having a first wavelength is reflected, a second reflective layer from which a second light having a second wavelength is reflected, and a holographic medium layer on which holographic data is recorded. The second reflective layer is adjacent to the holographic medium layer. The first reflective layer is disposed to be closer to or farther away from a side on which light is incident than the second reflective layer. Of the first and second reflective layers, the reflective layer that is disposed to be closer to the side on which light is incident may be a transreflective layer through which light having one wavelength of the first and second lights having the first and second wavelengths is transmitted and from which light having another wavelength is reflected.

In addition, the apparatus for recording/reproducing holographic data that is used to adjust a position of a recording layer in the holographic data storage medium may include first and second light sources which emit the first and second lights, respectively, an objective lens which condenses the first and second lights on the holographic data storage medium, a driving unit which drives the objective lens, a focus movement unit, a first photodetector, a second photodetector, and a controller. The focus movement unit moves a focus of the second light in a direction of an optical axis. The first photodetector detects the first light reflected from the holographic data storage medium and generates a first detection signal. The second photodetector detects the second light reflected from the holographic data storage medium and generates a second detection signal. The controller controls the apparatus for recording/reproducing holographic data to adjust a focal position of the second light in the holographic medium layer based on the first light.

According to an aspect of the present invention described below, the first reflective layer is a reflective layer, the second reflective layer is a transreflective layer through which a first light having a first wavelength is transmitted and from which a second light having a second wavelength is reflected, the first light is a servo light, and the second light is light emitted from a light source for recording/reproducing a hologram. Aspects of the present invention are not limited thereto, however; and various modifications and equivalent other embodiments are possible, including but not limited to the variations discussed above.

FIG. 1 illustrates a reflection type holographic data storage medium 10 that can be used in an apparatus for recording/reproducing holographic data, according to an embodiment of the present invention. Referring to FIG. 1, the reflection type holographic data storage medium 10 includes substrates 14 and 15, a reflective layer 11 from which a first light having a first wavelength is reflected, a transreflective layer 12, and a holographic medium layer 13 in which holographic data is recorded in an interference pattern. The first light may be red light and may further be a servo light. Similarly, the second light may be blue light and may be a light to record/reproduce a hologram. The first light is transmitted through the transreflective layer 12, and the second light is reflected through the transreflective layer 12. Holographic data is recorded in an interference pattern in the holographic medium layer 13.

The holographic medium layer 13 is a medium layer in which a recording mark hologram can be formed. The recording mark hologram may be, for example, a micro-hologram. The recording mark hologram is formed on a plane, thereby forming a single recording layer. In addition, a plurality of recording layers may be formed in a depth direction of the holographic medium layer 13. In FIG. 1, Lr1 and Lr2 denote a servo light incident on the reflective layer 11 and a servo light reflected from the reflective layer 11, respectively. Lb1 and Lb3 denote a reference light focused at a focal point Fb and a reference light focused at the focal point Fb and then diverged and reflected from the transreflective layer 12, respectively. Lb2 and Lb4 denote a signal light reflected from the transreflective layer 12 and then focused at the focal point Fb and a reflective signal light passing the focal point Fb and diverged, respectively. Fb denotes a focal point of a reference light.

The holographic data storage medium 10 may be in the form of a disk having a diameter of 120 mm, for example, like a CD, DVD, or BD. A hole (not shown) may be formed in the center of the holographic data storage medium 10. As illustrated in FIG. 1, the substrates 14 and 15 may be formed at bottom and top sides of the holographic data storage medium 10 respectively so as to protect the holographic medium layer 13 and the reflective layer 11. The substrates 14 and 15 may be formed of a material such as polycarbonate, glass, or the like.

Figure 2:
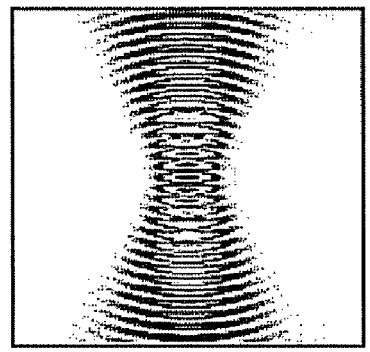
FIG. 2 is a photographic image of a recording mark hologram formed when a reference light and a signal light interfere with each other in a holographic medium layer of the reflection type holographic data storage medium illustrated in FIG. 1, according to an embodiment of the present invention.

The holographic medium layer 13 may be formed of a photopolymer having a refractive index that changes according to the intensity of light irradiated thereon. For example, the holographic medium 13 may be formed to react with a blue light having a wavelength of about 405 nm, such as the reference light Lb1 and the signal light Lb2. When the reference light Lb1 and the signal light Lb2 interfere with each other in the holographic medium layer 13, a hologram constituting a recording mark, is formed, as illustrated in FIG. 2. In this case, the recording mark hologram may be a micro-hologram. The substrates 14 and 15 may have refractive indices that are the same as or similar to those of the holographic medium layer 13.

A thickness d2 of the holographic medium layer 13 is sufficiently larger than a depth of the recording mark. For example, the holographic medium layer 13 may be designed to have a thickness of about 150 μm. In FIG. 1, d1 denotes a thickness of the substrate 14 that ranges from a bottom surface of the holographic data storage medium 10 to the holographic medium layer 13, d2 denotes a thickness of the holographic medium layer 13, and d3 is a distance between the transreflective layer 12 and the reflective layer 11.

One recording layer may be formed in the holographic medium layer 13 according to hologram recording due to interference between the signal light Lb2 and the reference light Lb1. Recording is performed while a position where hologram recording is performed is changed in the depth direction of the holographic medium layer 13, thereby forming a plurality of recording layers. Here, one recording layer may be obtained by forming the recording mark hologram on the same plane.

Lands, grooves, pits, etc., may be formed in the reflective layer 11 so as to perform tracking and focusing servo operations. The first light having the first wavelength that is incident through the substrate 14, is reflected by the reflective layer 11 back into the substrate 14. The first light may be, for example, the servo light Lr1 as a red light.

The transreflective layer 12 is a wavelength selective reflective layer through which the servo light (red light) is transmitted and from which the second light is reflected. As discussed above, the second light has the second wavelength, and may be, for example, a blue light (light used to record/reproduce a hologram). The transreflective layer 12 may be formed as a cholesteric liquid crystal layer to have a circular polarization separation function. The cholesteric liquid crystal layer has selective reflection characteristics such that, when a spiral rotation direction (turn right or left) of a liquid crystal coincides with a circular polarization direction of an incident light and a wavelength of the incident light is a spiral pitch of the liquid crystal, the cholesteric liquid crystal layer selectively reflects only its circular polarization component. For example, when the blue light is incident on the substrate 14 as right circular polarized light, light reflected from the transreflective layer 12 becomes right circular polarized.

As will be described later, when interference patterns are formed, the signal light Lb2 is reflected from the transreflective layer 12 and then is focused at the focal point Fb, and the reference light Lb1 is directly focused at the focal point Fb. In this case, the signal light Lb2 may be incident on the holographic data storage medium 10 as right circular polarized light, and the reference light Lb1 may be incident on the holographic data storage medium 10 as left circular polarized light. In consideration of this, the transreflective layer 12 may be formed so that the signal light Lb2 may be reflected from the transreflective layer 12, and the reference light Lb1 may be transmitted through the transreflective layer 12. In addition, the transreflective layer 12 may be formed so that a portion of the blue light that is left circular polarization polarized may be reflected from the transreflective layer 12. In this fashion, the reference light Lb1 can be used to adjust a position of a recording layer that will be described later.

As a more specific embodiment, the transreflective layer 12 may be formed such that the left circular polarized blue light is reflected from the transreflective layer 12 only in a partial region (for example, around the center near a hole) of the holographic data storage medium 10, and the right circular polarized blue light is reflected from the transreflective layer 12 in the remaining regions of the holographic data storage medium 10. Alternatively, the trans respective layer 12 may be formed so that the blue light that is right circular polarized is primarily reflected from the transreflective layer 12 over the entire region of the holographic data storage medium 10, and a portion of the left circular polarized blue light is reflected from the transreflective layer 12.

Figure 3:
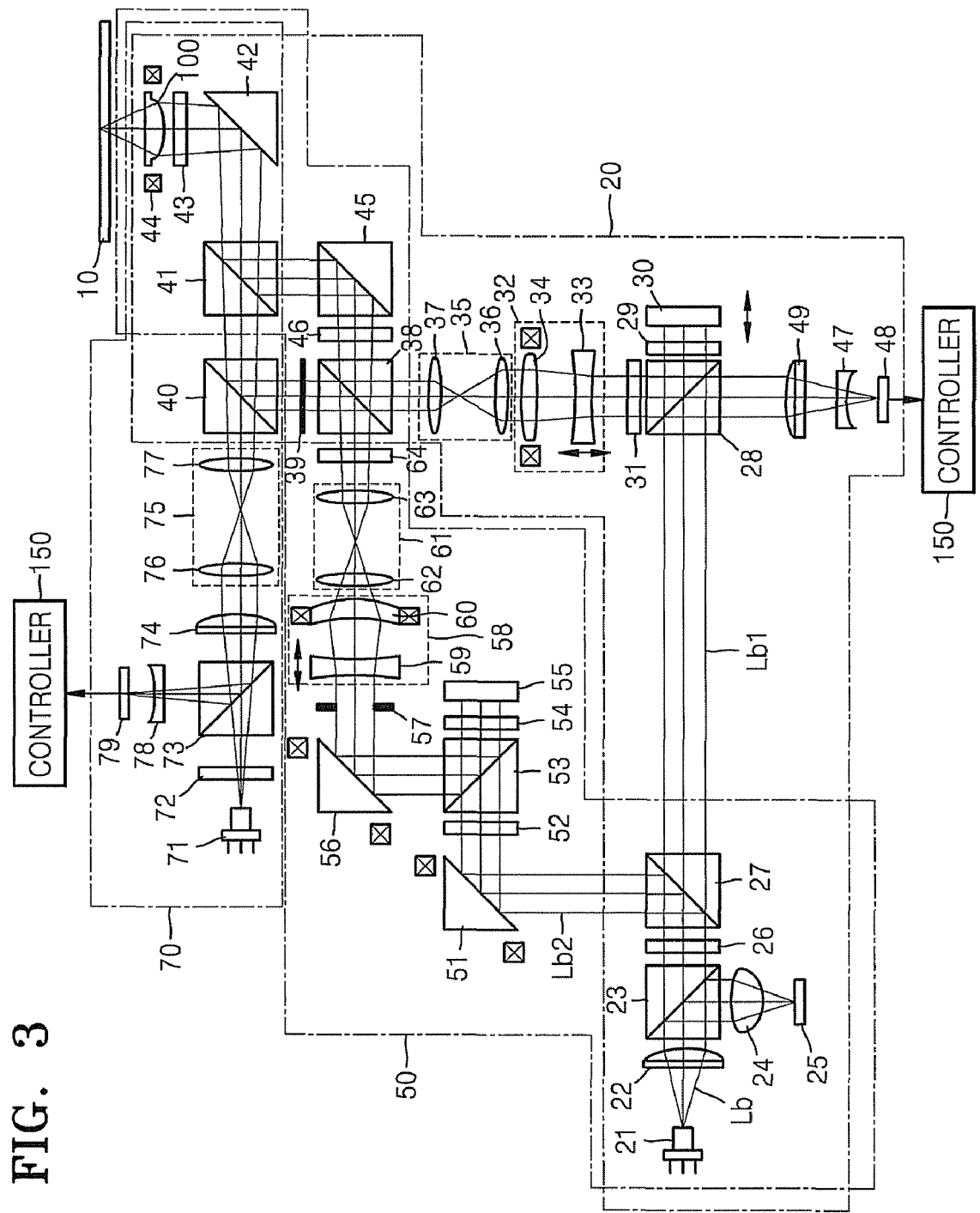
FIG. 3 illustrates a structure of an apparatus for recording/reproducing holographic data in which a position of a recording layer can be adjusted, according to an embodiment of the present invention.

FIG. 3 illustrates a structure of an apparatus for recording/reproducing holographic data in which a position of a recording layer can be adjusted, according to an embodiment of the present invention. Referring to FIG. 3, the apparatus for recording/reproducing holographic data according to the current embodiment includes first and second light sources 71 and 21 which emit a first light having a first wavelength and a second light having a second wavelength, respectively, an objective lens 100, a driving unit 44, a focus movement unit, a first photodetector 79, a second photodetector 48, and a controller 150. According to other aspects of the present invention, the apparatus may include additional and/or different units. Similarly, the functionality or two or more of the above units may be integrated into a single component.

The objective lens 100 condenses the first and second lights on the holographic data storage medium 10. The driving unit 44 drives the objective lens 100. The focus movement unit moves a focus of the second light in a direction of an optical axis. The first photodetector 79 detects the first light reflected from the reflective layer 11 of the holographic data storage medium 10 and generates a first detection signal. The second photodetector 48 detects the second light reflected from the transreflective layer 12 of the holographic data storage medium 10 and generates a second detection signal. The controller 150 controls the apparatus for recording/reproducing holographic data to adjust a focal position of the second light in the holographic medium layer 13 of the holographic data storage medium 10 based on the first light.

Figure 4:
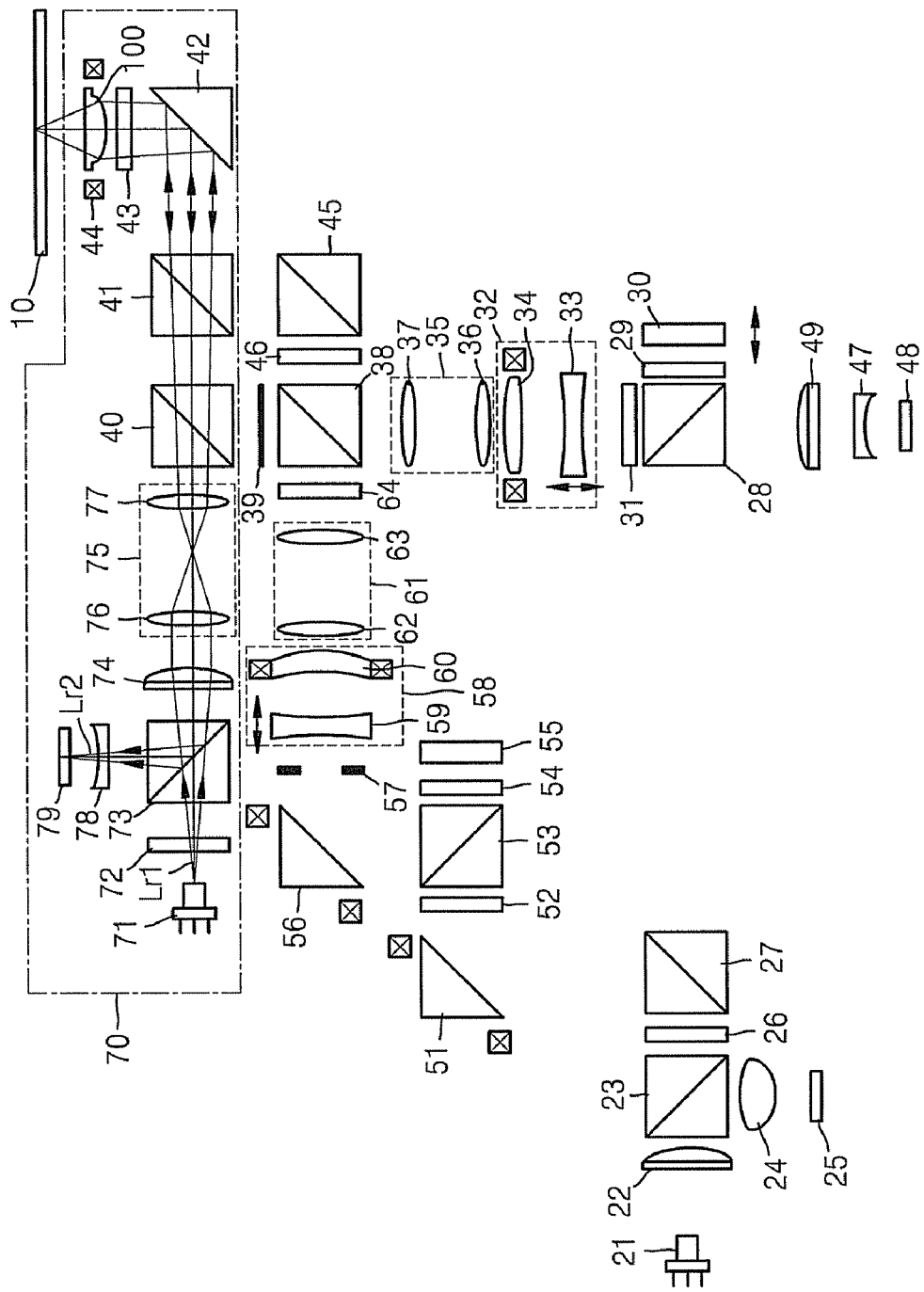
FIG. 4 illustrates an optical path of a servo light in the apparatus for recording/reproducing holographic data illustrated in FIG. 3, according to an embodiment of the present invention.
Figure 5:
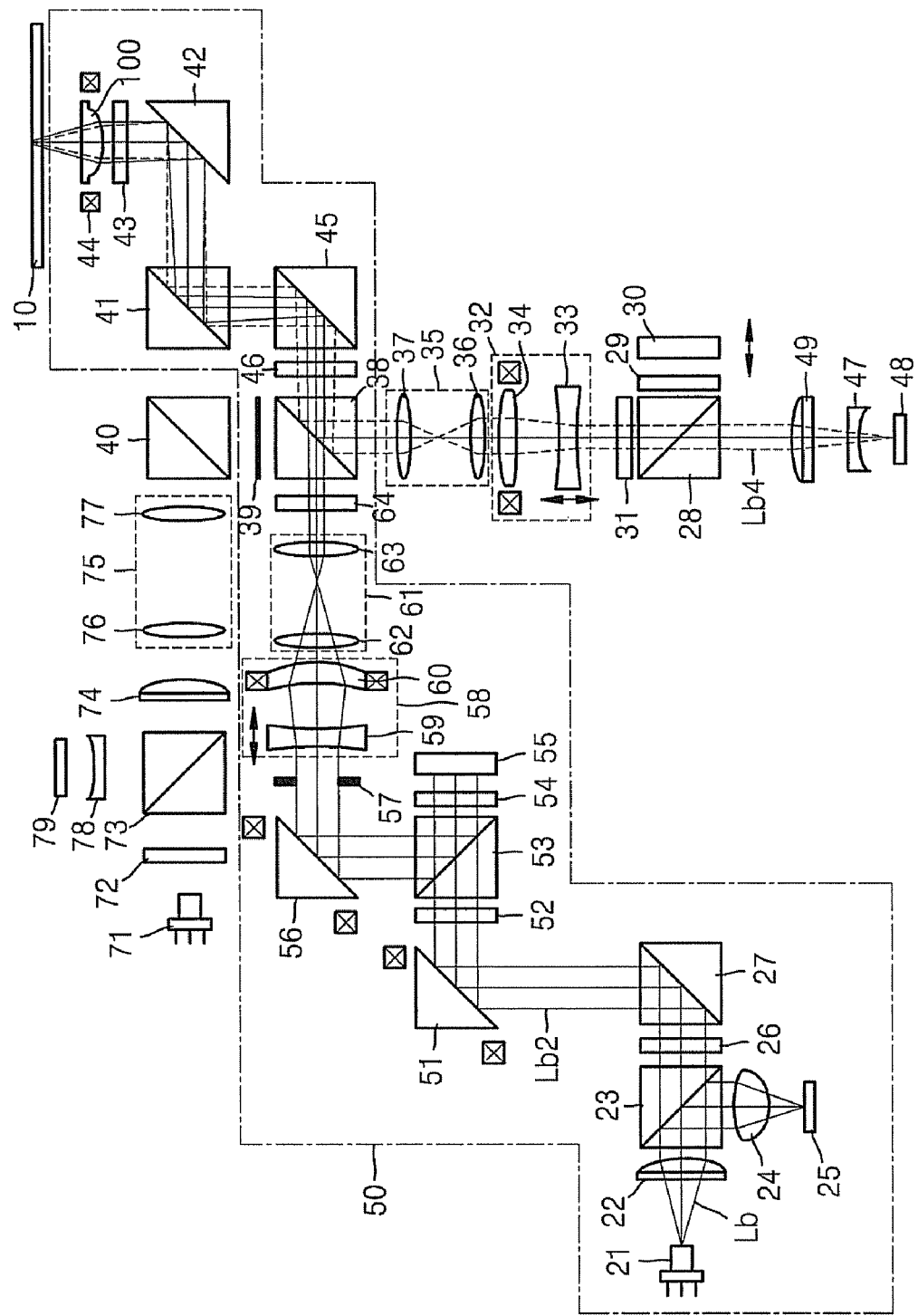
FIG. 5 illustrates an optical path of a signal light in a recording mode in the apparatus for recording/reproducing holographic data illustrated in FIG. 3, according to an embodiment of the present invention.
Figure 6:
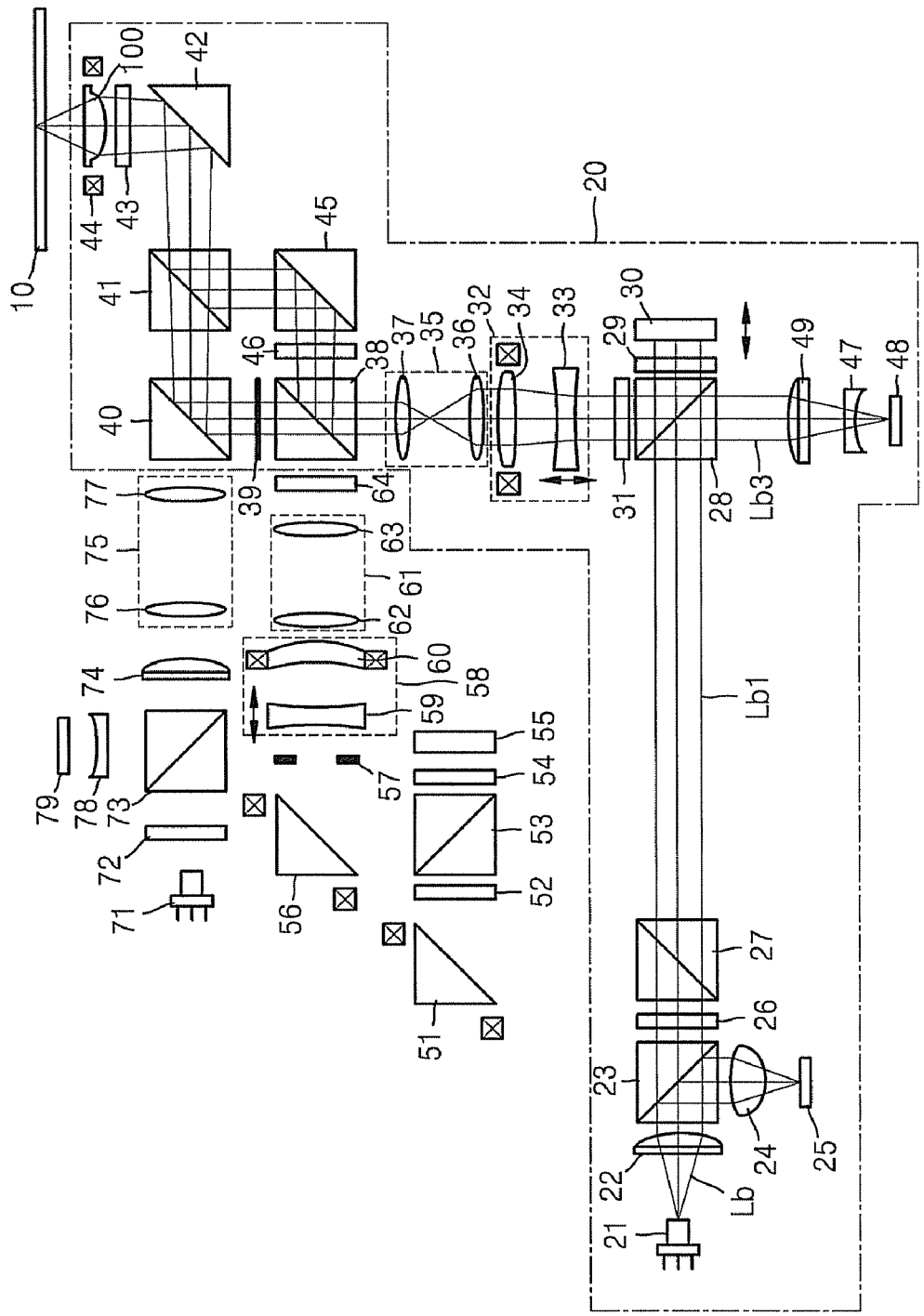
FIG. 6 illustrates an optical path of a reference light in a recording/reproducing mode in the apparatus for recording/reproducing holographic data illustrated in FIG. 3, according to an embodiment of the present invention.

FIGS. 4, 5, and 6 illustrate optical paths of a servo light, a signal light in a recording mode, and a reference light in a recording/reproducing mode in the apparatus for recording/reproducing holographic data illustrated in FIG. 3, respectively, according to embodiments of the present invention. Referring to FIG. 4, the servo optical system 70 may irradiate a first light having a first wavelength emitted from the first light source 71, i.e., a servo light Lr1 having a red wavelength, on the substrate 14 and may receive a servo light Lr2 reflected from the reflective layer 11.

The servo light Lr1 may have, for example, a wavelength of about 660 nm, for example. The servo light Lr1 diverged from the first light source 71 is divided by a grating 72 into three beams, including one main beam and two subbeams. The beams are transmitted through a polarization beam splitter 73, and are incident on a collimating lens 74.

The grating 72 may distribute the amount of light of the main beam to be larger than or the same as the amount of light of the sub-beams. In FIG. 4, illustration of the sub-beams is omitted. The polarization beam splitter 73 may transmit a p-polarization component of the incident servo light Lr1 and may reflect an s-polarization component of the incident servo light Lr1. The collimating lens 74 converts the servo light Lr1 diverged from the first light source 71 into parallel light. The servo light Lr1 converted into the parallel light is incident on a correction lens 75. The correction lens 75 may include two focusing lenses 76 and 77. The servo light Lr1 transmitted through the correction lens 75 is transmitted through dichroic prisms 40 and 41, is reflected on a mirror 42, is incident on a quarter wave plate (QWP) 43, is converted into circular polarized light, and is incident on the objective lens 100. The objective lens 100 condenses the servo light Lr1 on the reflective layer 11, to form a focus Fr (not shown) on the reflective layer 11 and reflect from the reflective layer 11 so that the reflective servo light Lr2 proceeds in a direction opposite to a direction of the incident servo light Lr1.

The objective lens 100 is designed to be optimized for the second light having the second wavelength emitted from the second light source 21, i.e., for the blue light for recording/reproducing a hologram, and is designed to be optimized for the first light having the first wavelength, i.e., the servo light Lr1 so that the servo light Lr1 can be condensed on the reflective layer 11 due to an optical distance between the correction lens 75 and the objective lens 100. The objective lens 100 may act as a condensing lens having a numerical aperture (NA) of about 0.63, for example, for the servo light Lr1. The numerical aperture is given here merely as an example; other numerical apertures may also be employed.

The dichroic prism 40 may be formed such that almost 100% of the red light (servo light) is transmitted through the dichroic prism 40, and almost 100% of the blue light (light for recording/reproducing a hologram and in the optical system of FIG. 3, reference light) is reflected by the dichroic prism 40. The dichroic prism 41 may be formed such that almost 100% of the red light may be transmitted through the dichroic prism 41, and for example, almost 100% of a p-polarization component of the blue light may be transmitted through the dichroic prism 41, and almost 100% of an s-polarization component of the blue light may be reflected by the dichroic prism 40. The mirror 42 may be formed that almost 100% of the red light and the blue light may be reflected by the mirror 42. The QWP 43 may convert all of the red light and the blue light of linearly polarization into circular polarized light.

The reflective servo light Lr2 is sequentially transmitted through the objective lens 100, the QWP 43, the mirror 42, the dichroic prisms 40 and 41, and the correction lens 75. The reflective servo light Lr2 is then converted into a parallel beam, condensed by the collimating lens 74, reflected by the polarization beam splitter 73, and received by the first photodetector 79. The apparatus for recording/reproducing holographic data may further include an astigmatism lens which is disposed between the polarization beam splitter 73 and the first photodetector 79, so as to perform a focus servo operation due to astigmatism generated in the reflective servo light Lr2. The astigmatism lens is shown in FIG. 4 as a cylindrical lens 78, although other arrangements are possible.

Since the holographic data storage medium 10 that rotates in the apparatus for recording/reproducing holographic data may be deflected or eccentric, there is a possibility that a target track and a corresponding focal position may be changed. Thus, the focus of the servo light Lr1 in the servo optical system 70 should be positioned in the target track and the corresponding focal position. To this end, the servo light Lr1 should be moved in a focusing direction and a tracking direction, corresponding to a thickness direction and a radial direction of the holographic data storage medium 10, respectively.

The driving unit 44 may be a two-axis actuator. The objective lens 100 may be driven in two axes of the focusing direction and the tracking direction so that the servo light Lr1 can move in the focusing direction and the tracking direction. According to additional aspects, the driving unit 44 may be a three-axis actuator, and the objective lens 100 may be driven with respect to radial tilt in addition to the focusing and tracking directions. The servo light Lr1 is condensed by the objective lens 100 on the reflective layer 11, and the reflective servo light L2 is received by the first photodetector 79. The reflective servo light Lr2 that is received by the first photodetector 79 reflects focusing and tracking states.

Figure 7A:
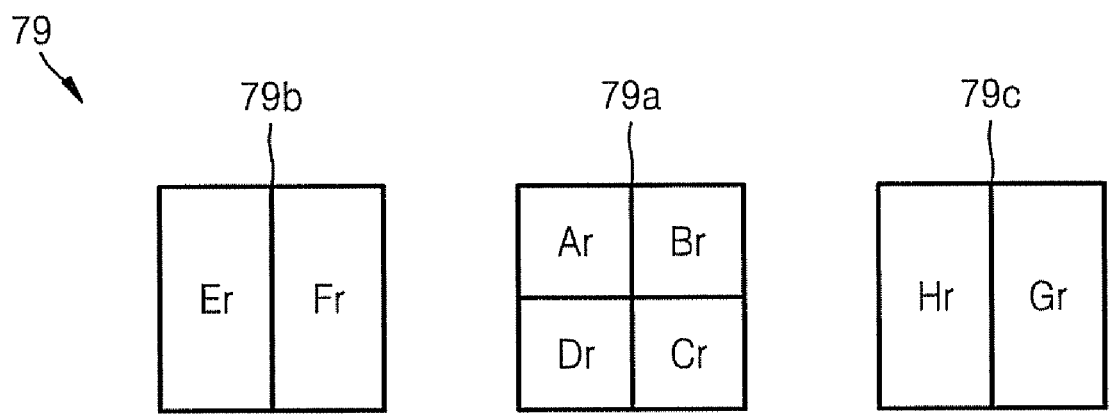
FIG. 7A illustrates a first photodetector of the apparatus for recording/reproducing holographic data of FIG. 3, according to an embodiment of the present invention.

FIG. 7A illustrates the first photodetector 79 according to an embodiment of the present invention. In order to detect a focus error signal and a tracking error signal, the first photodetector 79 may include a main photodetector 79a and first and second sub-photodetectors 79b and 79c. The main photodetector 79a includes four light-receiving regions Ar, Br, Cr, and Dr to receive main beams. The first and second sub-photodetectors 79b and 79c include two light-receiving regions Er, Fr and Hr, Gr respectively disposed at both sides of the main photodetector 79a in a radial direction to receive sub-beams.

Focus control may be performed using astigmatism using signals detected by the main photodetector 79a. A focus error signal FESr using a main beam detection signal that is received by the main photodetector 79a may be obtained from Equation 1. The focus error signal FESr is input to the controller 150 and is used to focus control the objective lens 100. For convenience of explanation, a light-receiving region of a photodetector and a signal detected by the photodetector are represented by the same symbol.

$$FESr=(Ar+Cr)-(Br+Dr) \quad (1)$$

Tracking control may be performed via a differential push pull method based on signals detected by the first and second sub-photodetectors 79b and 79c. A tracking error signal DPPr that is obtained using the differential push pull method indicates an amount corresponding to the amount by which the servo light Lr1 deviates from a target track and may be obtained by using Equation 2. In Equation 2, k is a gain.

$$MPPr=(Ar+Dr)-(Br+Cr)$$

$$SPPr1=Er-Fr$$

$$SPPr2=Gl-Hr$$

$$DPPr=MPPr-k(SPPr1+SPPr2) \quad (2)$$

As described above, the servo optical system 70 using the servo light Lr1 irradiates the servo light Lr1 on the reflective layer 11 of the holographic data storage medium 10 and performs focusing and tracking control of the objective lens 100 by using the detection signal of the reflective servo light Lr2.

An optical system for recording/reproducing a hologram may be configured to irradiate the second light having the second wavelength emitted from the second light source 21, i.e., the blue light Lb on the substrate 14 and receive the blue light Lb reflected from the transreflective layer 12. The optical system for recording/reproducing a hologram may include a signal light optical system 50 which contributes to transmitting the signal light Lb2 in a recording mode and a reference light optical system 20 which contributes to transmitting the reference light Lb1 in a recording mode and during reproduction.

Referring to FIGS. 5 and 6, the second light having the second wavelength (for example, the blue light Lb having a wavelength of about 405 nm) is diverged and emitted from the second light source 21 of the optical system for recording/reproducing a hologram. The blue light Lb is incident on the collimating lens 22 and is converted into parallel light. The blue light Lb converted into the parallel light is transmitted through an active half wave plate 26 and is reflected by or transmitted through the polarization beam splitter 27. The case in which the blue light Lb reflected by the polarization beam splitter 27 is used as the signal light Lb2 and the light transmitted through the polarization beam splitter 27 is used as the reference light Lb1 will now be described.

The active half wave plate 26 is an on/off type half wave plate. If power is applied to the active half wave plate 26, the active half wave plate 26 may act as a half wave plate. If power is not applied to the active half wave plate 26, the active half wave plate 26 may not act as a half wave plate. Thus, when power is applied to the active half wave plate 26, a polarization direction of the incident blue light Lb is rotated by the active half wave plate 26 at a predetermined angle, the signal light Lb2 having an s-polarization component is reflected by the polarization beam splitter 27, and the reference light Lb1 having a p-polarization component is transmitted through the polarization beam splitter 27. In a reproduction mode, power is not applied to the active half wave plate 26, and the active half wave plate 26 does not act as a half wave plate. As such, the blue light Lb emitted from the second light source 21 is transmitted through the polarization beam splitter 27 and proceeds along a proceeding path of the reference light Lb1 in a recording mode. All or most of the p polarized blue light Lb may be transmitted as described above. Although not required in all aspects, it is assumed here that the blue light Lb emitted from the second light source 21 is p-polarized.

As another embodiment, the active half wave plate 26 may comprise a rotation driving unit placed on a half wave plate so that a polarization direction is rotated at a predetermined angle and distribution of intensity of s-polarization and p-polarization can be adjusted according to a rotation angle.

The blue light Lb emitted from the second light source 21 is divided by the polarization beam splitter 27 into about 50% reference light Lb1 and about 50% signal light Lb2. The active half wave plate 26 may be used to adjust this division ratio.

Referring to FIG. 5, in the signal light optical system 50, the galvano mirrors 51 and 56 are used to change an angle of reflected light. The s-polarization signal light Lb2 is reflected by a galvano mirror 51, is converted by a half wave plate 52 into p-polarized light, is transmitted through the polarization beam splitter 53, is converted by a quarter wave plate (QWP) 54 into circular polarized light, and is re-reflected by a mirror 55. The re-reflected signal light Lb2 is converted by the QWP 54 into s-polarized light, is reflected by the polarization beam splitter 53, and is incident on a galvano mirror 56. The controller 150 may control the galvano mirrors 51 and 56 to adjust a proceeding direction of the signal light Lb2.

The signal light Lb2 reflected by the galvano mirror 56 is transmitted through a slit 57 and is incident on a beam expander 58. The beam expander 58 may include two actuating lenses 59 and 60. The signal light Lb2 is diverged by the actuating lens 59, is changed by the actuating lens 60 into focused light, is transmitted through a relay lens 61, is incident on the half wave plate 64 and is converted into p-polarized light.

As discussed above, the beam expander 58 includes two actuating lenses 59 and 60. The actuating lens 59 may move in a direction of an optical axis by using a stepping motor or a piezo motor and may be controlled coarsely. The actuating lens 60 may be moved in the direction of the optical axis using an actuator that is similar to the driving unit 44 for the objective lens 100 and may be controlled finely.

For example, the actuating lens 59 may position the signal light Lb2 in the general vicinity of a recording layer when a recording layer is moved in a thickness direction of the holographic data storage medium 10 and the actuating lens 60 may exactly position the signal light Lb2 on the recording layer. A movement distance of the actuating lens 59 may be larger than a movement distance of the actuating lens 60.

The relay lens 61 is used to obtain a distance between the objective lens 100 and the actuating lens 60 of the beam expander 58 and may include two convex lenses 62 and 63.

The p-polarized signal light Lb2 that is transmitted through the half wave plate 64 is transmitted through a polarization beam splitter 38 and is incident on an active half wave plate 46. A polarization direction of the incident, p-polarized signal light Lb2 is rotated by the active half wave plate 46 that is driven at a predetermined angle and is converted to mainly include an s-polarization component. The p-polarized signal light Lb2 may be converted by the active half wave plate 46 to include about 70% of an s-polarization component and about 30% of a p-polarization component.

The signal light Lb2 is reflected by the mirror 45 and is incident on the objective lens 100. Only the s-polarization component of the signal light Lb2 may be incident on the mirror 42 due to the dichroic prism 41 and converted into right circular polarized light, for example, due to the QWP 43. The signal light Lb2 is condensed by the objective lens 100 and is reflected from the transreflective layer 12 including a cholesteric liquid crystal layer and forms a focus at a point Fb. The objective lens 100 may condense the signal light Lb2 and may act as a condensing lens having a NA of about 0.4, for example, due to an optical distance between the objective lens 100 and the beam expander 58.

The signal light Lb2 that is condensed on the focus Fb is diverged and is re-incident on the objective lens 100. The reflective signal light is referred to here as Lb4. The reflective signal light Lb4 is reflected from the transreflective layer 12 including the cholesteric liquid crystal layer and has the same right circular polarization as the signal light Lb2. The reflective signal light Lb4 is converted by the QWP 43 into s-polarized light, is reflected by the mirror 42, the dichroic prism 41, and the mirror 45, and is incident on the active half wave plate 46. The s-polarization reflective signal light Lb4 is converted by the active half wave plate 46 to include about 30% of an s-polarization component and about 70% of a p-polarization component, for example. The s-polarization component of the reflective signal light Lb4 is reflected by the polarization beam splitter 38. The reflective signal light Lb4 having the reflected, s-polarization component is transmitted through a relay lens 35 and is incident on a beam expander 32. The reflective signal light Lb4 is converted by a half wave plate 31 into p-polarized light, is transmitted through the polarization beam splitter 28, is condensed by a condensing lens 49, and is received by the second photodetector 48 with astigmatism generated by a cylindrical lens 47.

The relay lens 35 and the beam expander 32 may perform the same functions as those of the relay lens 61 and the beam expander 58 described above. The relay lens 35 may include two convex lenses 36 and 37, and the beam expander 32 may include two actuating lenses 33 and 34.

Since the holographic data storage medium 10 may be deflected and eccentric, there is a possibility that a target track and a corresponding focal position may be changed. Thus, as above described, focusing and tracking control are performed by the servo optical system using the servo light as the red light and the controller 150. However, the signal light Lb2 may deviate from a position of the focus Fb of the reference light Lb1 due to movement of the objective lens 100. Accordingly, in the signal light optical system 50, optical positions of various optical parts may be adjusted by reflecting the state in which the reflective signal light Lb4 is received by the second photodetector 48 due to the amount by which the focus of the signal light Lb2 deviates from the focus Fb of the reference light Lb1 positioned in the holographic medium layer 13.

Figure 7B:
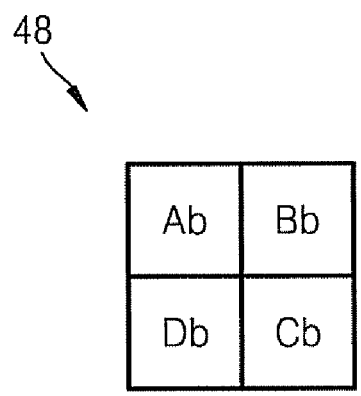
FIG. 7B illustrates a second photodetector of the apparatus for recording/reproducing holographic data of FIG. 3, according to an embodiment of the present invention.

In a recording mode, in order to perform focusing and tracking control on the signal light Lb2, the second photodetector 48 may include four light-receiving regions Ab, Bb, Cb, and Db, as illustrated in FIG. 7B. The second photodetector 48 detects the reflective signal light Lb4 from the four light-receiving regions Ab, Bb, Cb, and Db. A signal processing unit (not shown) performs focusing control due to astigmatism, calculates a focus error signal FESb from detection signals generated in the four light-receiving regions Ab, Bb, Cb, and Db using Equation 3 below, and supplies the calculated focus error signal FESb to the controller 150.

$$FESb = (Ab+Cb)-(Bb+Db) \quad (3)$$

The focus error signal FESb indicates a difference in a focusing direction between the focus Fb of the reference light Lb1 and the focus of the signal light Lb2.

Tracking control is performed using a push pull signal. A tracking error signal RPPb is calculated by using Equation 4 below and is supplied to the controller 150.

$$RPPb = (Ab+Db)-(Bb+Cb) \quad (4)$$

The tracking error signal RPPb indicates a difference in a tracking direction between the focus Fb of the reference light Lb1 and the focus of the signal light Lb2.

A tangential error signal TPPb that is needed to perform tangential control may be generated using Equation 5 below. In tangential control, the signal light Lb2 is positioned on the focus Fb of the reference light Lb1 with respect to a tangential direction of the holographic data storage medium 10.

$$TPPb = (Ab+Bb)-(Cb+Db) \quad (5)$$

The tangential error signal TPPb indicates a difference in a tangential direction of the holographic data storage medium 10 between the focus Fb of the reference light Lb1 and the focus of the signal light Lb2.

The controller 150 may generate a focus driving signal based on the focus error signal FESb, supply the focus driving signal to the actuating lens 60 of the beam expander 58, and focus control the actuating lens 60 so as to reduce the difference in the focusing direction between the focus Fb of the reference light Lb1 and the focus of the signal light Lb2. In addition, the controller 150 may generate a tracking driving signal based on the tracking error signal RPPb, supply the tracking driving signal to the galvano mirror 56, and control tracking of the galvano mirror 56 so as to reduce the difference in the tracking direction between the focus Fb of the reference light Lb1 and the focus of the signal light Lb2. The controller 150 may also generate a tangential driving signal based on the tangential error signal TPPb, supply the tangential driving signal to the galvano mirror 51 and tangentially control the galvano mirror 51 so as to reduce the difference in the tangential direction between the focus Fb of the reference light Lb1 and the focus of the signal light Lb2.

The signal light optical system 50 may irradiate the signal light Lb2 on the holographic data storage medium 10, receive the reflective signal light Lb4 that is reflected from the transreflective layer 12, and supply the result of light-receiving to the signal processing unit (not shown). The controller 150 may perform focusing control of the actuating lens 60 of the beam expander 58 and may perform tangential and tracking control of the galvano mirrors 51 and 56 so as to form the focus of the signal light Lb2 on the focus Fb of the reference light Lb1.

Referring to FIG. 6, in the reference light optical system 20, the blue light Lb emitted from the second light source 21 is converted into parallel light while transmitting through the collimating lens 22. The blue light Lb includes an s-polarization component and a p-polarization component while transmitting through the active half wave plate 26. The s-polarization component of the blue light Lb is reflected by the polarization beam splitter 27 and is used as the signal light Lb2, as described previously.

The p-polarization component of the blue light Lb may be transmitted through the polarization beam splitter 27 and may be used as the reference light Lb1. The reference light Lb1 that is transmitted through the polarization beam splitter 27 is incident on the polarization beam splitter 28. The p-polarized reference light Lb1 that is transmitted through the polarization beam splitter 28 is converted by the QWP 29 into left circular polarized light, is reflected by the mirror 30, is converted by the QWP 29 into s-polarized light, is reflected by the polarization beam splitter 28 and proceeds toward the half wave plate 31. The s-polarized reference light Lb1 is converted by the half wave plate 31 into p-polarized light and is incident on the beam expander 32.

The mirror 30 is movably disposed and may fit lengths of optical paths of the reference light Lb1 and the signal light Lb2 by changing the length of an optical path of the reference light Lb1 due to movement of the mirror 30. In order to fit the lengths of the optical paths of the reference light Lb1 and the signal light Lb2, the mirror 55 in the signal light optical system 50 may be driven or both the mirror 55 in the signal light optical system 50 and the mirror 30 in the reference light optical system 20 may be driven. When a laser diode is used as the second light source 21, a coherence length is about several hundreds of microns. When a difference in the lengths of the optical paths of the reference light Lb1 and the signal light Lb2 is equal to or larger than the coherence length, a recording mark (hologram) formed on the focus between the reference light Lb1 and the signal light Lb2 may not be accurately recorded. Thus, in order to form a good hologram, the difference between the lengths of the optical paths of the reference light Lb1 and the signal light Lb2 should be adjusted to be equal to or smaller than the coherence length by, for example, adjusting the mirror 30. Other adjustments may also be made to adjust the length of the optical paths of the reference light Lb1 and the signal light Lb2.

The p-polarized reference light Lb1 that is incident on the beam expander 32 is diverged by the actuating lens 33 and is re-converged by the actuating lens 34. The reference light Lb1 that is transmitted through the beam expander 32 is transmitted through the relay lens 35 and is incident on the polarization beam splitter 36. The reference light Lb1 is p-polarized, as described above, and thus is transmitted through the polarization beam splitter 36 and is incident on a shutter 39. As described above, the beam expander 32 and the relay lens 35 may perform the same functions as those of the beam expander 58 and the relay lens 61.

The shutter 39 is controlled using the controller 150 so that the reference light Lb1 is intercepted by or is transmitted through the shutter 39. When the reference light Lb1 is transmitted through the shutter 39, the reference light Lb1 is p-polarized blue light, is reflected by the dichroic prism 40, is transmitted through the dichroic prism 41, and is incident on the mirror 42. The reference light Lb1 is reflected by the mirror 42, is converted by the QWP 43 into left circular polarized light, and is condensed by the objective lens 100 on the holographic data storage medium 10.

The objective lens 100 condenses the reference light Lb1 and may act as a condensing lens having a NA of about 0.65, for example, due to the optical distance between the objective lens 100 and the beam expander 32. The NA of the objective lens 100 with respect to the reference light Lb1 may be larger than the NA of the objective lens 100 with respect to the signal light Lb2, because the reference light Lb1 is condensed by the objective lens 100 and is directly focused at the point Fb, whereas the signal light Lb2 is condensed by the objective lens 100, is reflected from the transreflective layer 12, and is focused at the point Fb. The focal distance of the signal light Lb2 may therefore be larger than the focal distance of the reference light lb1. Aspects of the present invention are not limited to the reference light Lb1 being directly focused at the point Fb and the signal light Lb2 being reflected from the transreflective layer 12 and then focused at the point Fb. The embodiment described herein is merely an example.

In a recording mode, there is almost no reference light Lb1 that is reflected from the transreflective layer 12 of the holographic data storage medium 10 and returns to the objective lens 100. Because only right circular polarized light is reflected from the transreflective layer 12 due to the characteristics of the transreflective layer 12, the reference light Lb1 that is incident on the holographic data storage medium 10 as left circular polarized light is not reflected from the transreflective layer 12.

As described above, when a blue light that is left circular polarized in a partial region (for example, around a center near a hole) of the holographic data storage medium 10 is reflected from the transreflective layer 12 and the blue light that is right circular polarized in the remaining regions of the holographic data storage medium 10 is reflected from the transreflective layer 12, recording may be performed in a region in which only the blue light that is right circular polarized is reflected. In this case, no reference light Lb1 is reflected from the transreflective layer 12 and returns to the objective lens 100 in a region in which recording is performed. When the blue light that is right circular polarized is primarily reflected and a portion of the blue light that is left circular polarized is partially reflected over the entire region of the holographic data storage medium 10, the signal light Lb2 that is right circular polarized may be primarily reflected from the transreflective layer 12, and the reference light Lb1 that is left circular polarized may be partially reflected from the transreflective layer 12 during recording. In this case, the reference light Lb1 that is left circular polarized may be a reflective reference light Lb3 that is right circular polarized by reflection.

In a reproduction mode, the active half wave plate 26 does not act as a half wave plate, and the p-polarized blue light Lb emitted from the second light source 21 is transmitted through the active half wave plate 26 without a change of polarization, is transmitted through the polarization beam splitter 27, and proceeds along the optical path of the reference light Lb1 in a recording mode. Thus, the blue light used in the reproduction mode is the same as the reference light Lb1 in the recording mode, and it is assumed herein that the blue light in the reproduction mode is the reference light Lb1.

When a mark recorded in the holographic medium layer 13 of the holographic data storage medium 10, i.e., a hologram, is reproduced, a reference light in which the hologram is reproduced is incident on the objective lens 100. The reference light in which the hologram is reproduced shall hereinafter be referred to as a reproduction light. The reference light Lb1 is incident on the holographic data storage medium 10 in a left circular polarization state, and a proceeding direction of the reproduction light reflected by the hologram is changed, but a rotation direction of a field vector is not changed. Thus, the reproduction light reflected by the hologram becomes right circular polarized light. The right circular polarized reproduction light is changed by the QWP 43 into s-polarized light, is reflected by the mirror 42, is reflected by the dichoric prism 41, is reflected by the mirror 45, and is incident on the active half wave plate 46.

Since power is not applied to the active half wave plate 46 during reproduction and the active half wave plate 46 does not act as a half wave plate, s-polarized reproduction light is transmitted through the active half wave plate 46 without a change of polarization, is reflected by the polarization beam splitter 38, and is incident on the relay lens 35. The s-polarized reproduction light that is transmitted through the relay lens 35 is transmitted through the beam expander 32 to be changed into a parallel beam, is converted by the half wave plate 31 into p-polarized light and is transmitted through the polarization beam splitter 28. The transmitted, p-polarized reproduction light is condensed by the condensing lens 49, is transmitted through the cylindrical lens 47 and is received by the second photodetector 48. Recording mark hologram data recorded in a predetermined recording layer can be obtained from the reproduction light signal detected by the second photodetector 48.

Figure 8:
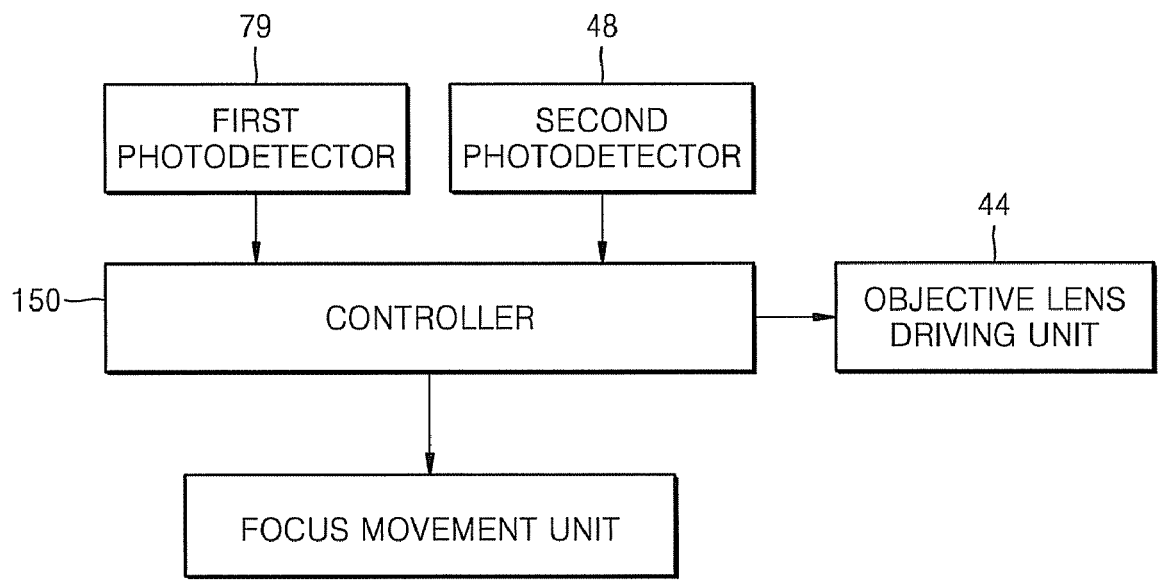
FIG. 8 illustrates the relationship between signal input between a controller, the first and second photodetectors, a focus adjustment unit, and an objective lens driving unit in FIG. 3, according to an embodiment of the present invention.

FIG. 8 illustrates the relationship between signal input between the controller 150, the first and second photodetectors 79 and 48, a focus adjustment unit, and the driving unit, according to an embodiment of the present invention. Referring to FIG. 8, in order to effectively adjust a desired position of a recording layer by adjusting a focus Fb of the second light in the holographic medium layer 13, for example, the reference light Lb1, the controller 150 processes signals detected by the first and second photodetectors 79 and 48 and controls the driving unit 44 to drive the objective lens 100 and controls the focus movement unit to adjust a focal position of the second light. The focus movement unit may be, for example, the actuating lens of the beam expander 32. Here, the controller 150 controls several elements. According to other aspects of the invention, at least some of the elements may be controlled by an additional controller. The controller 150 may include a signal processing unit (not shown) for obtaining signals used in control, such as a sum signal, a focus error signal, a tracking error signal, and a tangential error signal. Alternatively, the signal processing unit (not shown) may be separately provided, and signals obtained by the signal processing unit (not shown) may be input to the controller 150.

Due to control performed by the controller 150, while the objective lens 100 reciprocatingly moves in a direction of an optical axis, the focus movement unit is controlled to move the focal position of the reference light Lb1 so that the focal position of the reference light Lb1 can be adjusted to the desired position of the desired recording layer. The focus movement unit moves the focus of the reference light Lb1 in the direction of the optical axis until a time difference between the time at which a first detection signal is generated when the signal light Lr1 is reflected from the reflective layer 11 and the time at which a second detection signal is generated when the reference light Lb1 is reflected from the transreflective layer 12 equates to a value corresponding to a desired position of the recording layer.

In addition, due to control performed by the controller 150, while the objective lens 100 reciprocatingly moves in the direction of the optical axis, the focus movement unit is controlled to move the focal position of the reference light Lb1. Here, the focus movement unit moves the focus Fb of the reference light Lb1 in the direction of the optical axis until a position of a first detection signal of a servo light Lr reflected from the reflective layer 11 is the same as a position of a second detection signal based on a reference light Lb3 reflected from the transreflective layer 12. A position at which the position of the first detection signal of the servo light Lr2 reflected from the reflective layer 11 may be the same as the position of the second detection signal based on the reference light Lb3 reflected from the transreflective layer 12, is set as a reference position of the focus movement unit. The servo light Lr1 is focused on the reflective layer 11 using the objective lens 100, and the focus movement unit moves by displacement from the reference position, thereby moving the focus Fb of the reference light Lb1 in the direction of the optical axis so that the focal position of the reference light Lb1 can be adjusted to a desired position.

In this case, the first detection signal may be a sum signal (Ar+Br+Cr+Dr) of signals detected in light-receiving regions of the main photodetector 79a of the first photodetector 79, or a focus error signal. In addition, the second detection signal may be a sum signal (Ab+Bb+Cb+Db) of signals detected in a plurality of light-receiving regions of the second photodetector 48, or a focus error signal. A method of adjusting a position of a recording layer according to control of the controller 150 will be described later in more detail.

Data is recorded in the holographic data storage medium 10 using the apparatus for recording/reproducing holographic data according to aspects of the present invention as described below.

The servo light Lr1 is irradiated on the holographic data storage medium 10 by using the servo optical system 50, and focus and tracking control of the objective lens 100 is performed based on the result of detection of the reflective servo light Lr2 reflected from the reflective layer 11, and the focus Fr of the servo light Lr1 is tracked on a target track.

In addition, the blue signal light Lb2 is irradiated on the holographic data storage medium 10. The focus Fb of the signal light Lb2 is positioned on the target track using the objective lens 100. The blue signal light Lb2 is positioned on the focus Fb by adjusting the position of the actuating lens 59 of the beam expander 58 and by adjusting a target depth corresponding to the focus Fb.

In addition, the controller 150 controls the shutter 39 so that the reference light Lb1 is transmitted through the shutter 39 and is incident on the holographic data storage medium 10.

Recording power control of the second light source 21 is adjusted by detecting light that is received by a front photodetector 25. A portion of light emitted from the second light source 21 is diverged by the beam splitter 23, is focused by the focusing lens 24 and is received by the front photodetector 25.

Since the holographic data storage medium 10 may be deflected and eccentric, the signal light Lb2 may deviate from a desired position of the focus Fb. Accordingly, tangential, tracking, and focusing control is performed by the galvano mirrors 51 and 56 and the actuating lens 60 of the beam expander 58 based on the result of detection of the reflective signal light Lb4. Thus, the reference light Lb1 and the signal light Lb2 may converge in the position of the focus Fb.

In this way, in the state in which the reference light Lb1 and the signal light Lb2 converge in the position of the focus Fb, the mirror 30 is moved so that a difference in the lengths of optical paths of the reference light Lb1 and the signal light Lb2 is adjusted to be equal to or less than a coherence length. In this fashion, a good recording mark hologram can be recorded.

Data is reproduced in the holographic data storage medium 10 using the apparatus for recording/reproducing holographic data according to aspects of the present invention as below. By using the servo optical system 50, the servo light Lr1 is irradiated on the holographic data storage medium 10 and focus and tracking control of the objective lens 100 is performed based on the result of detection of the reflective servo light Lr2 reflected from the reflective layer 11, and the focus Fr of the servo light Lr1 is tracked on a target track.

The reference light Lb1 is irradiated on the holographic data storage medium 10 using the reference optical system 20. The focus Fb of the reference light Lb1 may be condensed by the objective lens 100 of which position is controlled and may be positioned while deviating from the target track.

Coarse control is performed by the actuating lens 33 of the beam expander 32. Fine control is performed by the actuating lens 34, and thus the focus Fb of the reference light Lb1 may be appropriately positioned.

Since power is not applied to the active half wave plate 26 during reproduction so that the active half wave plate 26 does not act as a half wave plate, all or almost all of the blue light Lb emitted from the second light source 21 becomes the reference light Lb1. Thus, reproduction efficiency can be enhanced, and the reference light Lb1 is transmitted through the shutter 39 by controlling the shutter 39.

The reference light Lb1 is irradiated on the recording mark hologram, a reproduction light is generated by the recording mark hologram, and the reproduction light is detected by the second photodetector 48, thereby obtaining reproduction signals. When power is not applied to the active half wave plate 46 so that the active half wave plate 46 does not act as a half wave plate, efficiency for receiving the reproduction light can be enhanced.

A method of seeking a position of a desired recording layer so as to record a hologram according to an embodiment of the present invention will now be described. As described above, the transreflective layer 12 in the holographic data storage medium 10 is a wavelength selective reflective layer through which a red light is transmitted and from which a blue light is reflected. In addition, the transreflective layer 12 is formed as a cholesteric liquid crystal layer and has a circular polarization separation function. The transreflective layer 12 may be formed so that the light that is left circular polarized in a partial region of the holographic data storage medium 10 (for example, around a center of the holographic data storage medium 10) can be reflected from the transreflective layer 12, and the light that is right circular polarized in the remaining regions of the holographic data storage medium 10 can be reflected from the transreflective layer 12. Alternatively, the transreflective layer 12 may be formed so that a portion of the light that is left circular polarized over the entire region of the holographic data storage medium 10 may be reflected from the transreflective layer 12.

In order to determine a desired recording layer (position of an initial recording layer) in which a hologram is to be recorded, a case will be described in which a red light Lr that is used as a servo light is used as a first light reflected from the reflective layer 11 and is detected by the first photodetector 79 to generate a first detection signal, a reference light Lb1 is used as a second light reflected from the transreflective layer 12 and is detected by the second photodetector 48 to generate a second detection signal.

During hologram recording mode, a signal light Lb2 may be used to generate the second detection signal. As described above, during hologram recording mode, the apparatus for recording/reproducing holographic data has an optical arrangement in which the signal light is directly focused at the focus Fb and the reference light is reflected from the transreflective layer 12 and is focused at the focus Fb. In the apparatus for recording/reproducing holographic data illustrated in FIGS. 3 through 5, When the reference light Lb1 is used to generate the second detection signal for adjusting the position of the recording layer, the beam expander 32 may be used as a focus movement unit, which moves the focus of the reference light Lb1 in the direction of the optical axis. When the signal light Lb2 is used to generate the second detection signal for adjusting the position of the recording layer, the beam expander 58 may be used as a focus movement unit, which moves the focus of the signal light Lb2 in the direction of the optical axis. The actuating lens 59 of the beam expander 58 may employed for this purpose.

A sum signal that is obtained by detecting the servo light Lr1 reflected from the reflective layer 11 may be used as the first detection signal. A sum signal that is obtained by detecting the reference light Lb1 reflected from the transreflective layer 12 may be used as the second detection signal. In addition, a focus error signal that is obtained by detecting the servo light Lr1 reflected from the reflective layer 11 may be used as the first detection signal, and a focus error signal that is obtained by detecting the reference light Lb1 reflected from the transreflective layer 12 may be used as the second detection signal.

Figure 9:
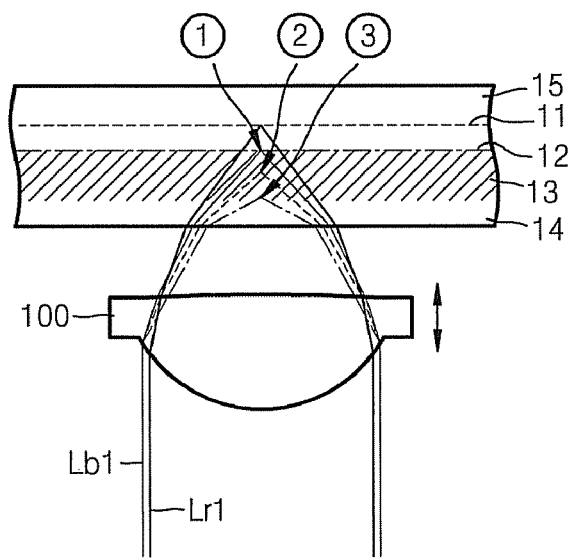
FIG. 9 illustrates a servo light and a reference light, which are focused by an objective lens on a holographic data storage medium, according to an embodiment of the present invention.
Figure 10:
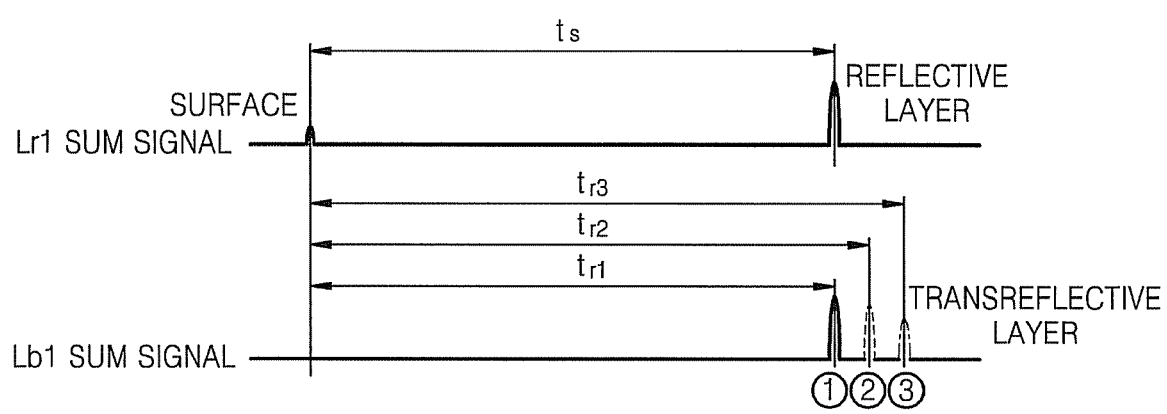
FIG. 10 illustrates a detection signal of a servo light and a detection signal of a reference light, which are obtained when an objective lens is focus searched as a driving unit is driven, according to an embodiment of the present invention.

While the first and second light sources 71 and 21, which respectively emit the servo light Lr1 and the blue light Lb, are turned on and the servo light Lr1 and the reference light Lb1 are condensed by the objective lens 100, as illustrated in FIG. 9, the objective lens 100 is focus searched as the driving unit 44 is driven, and a sum signal as illustrated in FIG. 10 is generated. For the servo light Lr1, a sum signal of the servo light Lr1 reflected from the surface of the holographic data storage medium 10, and a sum signal of the servo light Lr1 reflected from the reflective layer 11 are generated, and a distance from the surface of the holographic data storage medium 10 to the reflective layer 11 is measured by measuring a distance ts between the sum signals. In the case of the holographic data storage medium 10, a thickness thereof (ds=d1+d2+d3), i.e., the distance from the surface of the holographic data storage medium 10 to the reflective layer 11, is already known. Thus, the measured distance ts may be converted into a thickness. Here, d1 is a thickness of the substrate 14 from the surface of the holographic data storage medium 10 to the holographic medium layer 13, d2 is a thickness of the holographic medium layer 13, and d3 is a distance between the transreflective layer 12 and the reflective layer 11.

For the reference light Lb1, a sum signal of the reference light Lb1 reflected from the surface of the holographic data storage medium 10, and a sum signal of the reference light Lb1 reflected from the transreflective layer 12, are generated. The sum signal of the reference light Lb1 reflected from the surface of the holographic data storage medium 10 is not used, and thus, is not illustrated in FIG. 10. In FIGS. 9 and 10, ① represents the case where the reference light Lb1 is exactly focused on the transreflective layer 12, ② represents the case where the reference light Lb1 is focused in front of the transreflective layer 12, and ③ represents the case where the reference light Lb1 is focused in front of ②. When the reference light Lb1 is focused in the positions ①, ②, and ③, the position of the actuating lens 36 of the beam expander 35 is changed so that aberration can be minimized. When the reference light Lb1 is focused in the positions ①, ②, and ③, if the objective lens 100 moves reciprocatingly, the position of the sum signal illustrated in FIG. 10 is changed.

A reflective reference light Lb3 that is received by the second photodetector 48 is focused in each of the positions ② and ③. The focus of the reference light Lb1 is moved up to the transreflective layer 12 due to a reciprocating motion of the objective lens 100, is reflected from the transreflective layer 12, and then proceeds toward the second photodetector 48. In this case, since spherical aberration corresponding to a distance between the initial positions ② and ③ before the objective lens 100 reciprocatingly moves and the transreflective layer 12 is generated, in the case of ②and ③, the amount of light received by the second photodetector 48 is reduced, and the size of the sum signal is reduced compared to the case of ①.

A time interval ts of the sum signal with respect to the servo light Lr1 generated from the reflective layer 11 can be determined based on the sum signal with respect to the servo light Lr1 reflected from the surface of the holographic data storage medium 10. In addition, a time interval tr of the sum signal with respect to the reference light Lb1 generated from the transreflective layer 12 can be determined based on the sum signal with respect to the servo light Lr1 reflected from the surface of the holographic data storage medium 10. By calculating a difference (tsdr=ts−tr) between the time intervals of the two sum signals, converting tsdr from ds, and adding a thickness of the transreflective layer 12 and/or the reflective layer 11 that is already known to tsdr, if necessary, it can be determined how far the focal position of the reference light Lb1 is from the reflective layer 11. The data indicates a position of the holographic data storage medium 10 in which the reference light Lb1 is positioned. Thus, when a user knows trecord=ts−tr of a desired recording position, the already-known trecord is compared with the currently-calculated tsdr, and the reference light Lb1 is moved to a position in which trecord coincides with tsdr.

When the desired recording position trecord is determined, the desired recording position trecord may be determined in a state which spherical aberration that is generated due to a difference between the desired recording position and the transreflective layer 12 is corrected. For the servo light Lr1, aberration in the reflective layer 11 may be designed to be optimized by the correction lens 75 and the objective lens 100. For the reference light Lb1, aberration in the holographic medium layer 13 may be designed to be optimized by the beam expander 32 and the objective lens 100. When the position of the reference light Lb1 in the holographic medium layer 13 is changed by the actuating lens 33 of the beam expander 32, aberration is not generated. However, when the focus of the reference light Lb1 is far away from the transreflective layer 12, if the objective lens 100 reciprocatingly moves, a signal reflected from the transreflective layer 12 is a signal in the state where spherical aberration is generated to a distance between the focus of the reference light Lb1 and the transreflective layer 12. In addition, in the case of the servo light Lr1, the sum signal generated from the holographic data storage medium 10 is obtained in the state where spherical aberration is generated. When spherical aberration is generated, a focus forming position is changed by spherical aberration and thus correction of the spherical aberration may be needed.

In order to perform recording, the focus Fb of the reference light Lb1 may be positioned in a position of a desired recording layer. The recording layer is obtained by forming a recording mark hologram on the same plane within the holographic medium layer 13. A plurality of recording layers may be formed in the holographic medium layer 13 at predetermined intervals. Thus, seeking a position of the desired recording layer refers to seeking a position in which the recording mark hologram is to be recorded in a thickness direction of the holographic medium layer 13.

The focal position of the reference light Lb1 is adjusted by considering the first detection signal, for example, the sum signal, of the servo light Lr2 reflected from the reflective layer 11 and the second detection signal, for example, the sum signal of the reference light Lb3 reflected from the transreflective layer 12.

For example, while the objective lens 100 reciprocatingly moves in the direction of the optical axis, the focus movement unit is controlled to move the focal position of the reference light Lb1 so that the focal position of the reference light Lb1 can be adjusted to the position of the desired recording layer. As described above, the focus movement unit moves the focus of the reference light Lb1 in the direction of the optical axis until a time difference between the time at which the first detection signal generated when the servo light Lr1 is reflected from the reflective layer 11 and the time at which second detection signal generated when the reference light Lb1 is reflected from the transreflective layer 12 equates to a value corresponding to a position of the desired recording layer, any may be, for example, the actuating lens 33 of the beam expander 32. In this way, when, in the state in which the focus Fb of the reference light Lb1 is positioned in the position of the desired recording layer, the current mode is changed into a recording mode and the signal light optical system 50 is controlled so that the signal light Lb2 makes a focus on in the position of the focus Fb of the reference light Lb1, the recording mark hologram can be formed in the position of the focus Fb, i.e., in the desired recording layer. Here, control of the signal light optical system 50 may include control of the active half wave plates 26 and 46 and control of the actuating lenses 59 and 60 of the beam expander 58.

The time difference between the first and second detection signals may correspond to a difference in time interval between the first detection signals of the servo light Lr2 reflected from the surface of the holographic data storage medium 10 and the reflective layer 11 and the time interval of the second detection signal of the reference light Lb3 reflected from the transreflective layer 12 based on the first detection signal of the servo light Lr2 reflected from the surface of the holographic data storage medium 10.

In addition, the time difference between the first and second detection signals may be a value that is obtained by correcting an error caused by spherical aberration of the first detection signal generated from the surface of the holographic data storage medium 10 and an error caused by spherical aberration of the second detection signal generated according to a degree by which the desired recording position deviates from the transreflective layer 12.

Meanwhile, while the objective lens 100 reciprocatingly moves in the direction of the optical axis, the focus movement unit is controlled to move the position of the focus Fb of the reference light Lb1. As described above, the focus movement unit moves the focus Fb of the reference light Lb1 in the direction of the optical axis until a position of the first detection signal of the servo light Lr2 reflected from the reflective layer 11 is the same as a position of the second detection signal based on the reference light Lb3 reflected from the transreflective layer 12. A position at which the position of the first detection signal of the servo light Lr2 reflected from the reflective layer 11 is the same as the position of the second detection signal based on the reference light Lb3 reflected from the transreflective layer 12, is set as a reference position of the focus movement unit. The servo light Lr1 is focused on the reflective layer 11 by using the objective lens 100, and the focus movement unit moves by displacement from the reference position, and the focus Fb of the reference light Lb1 is moved in the direction of the optical axis so that the focal position of the reference light Lb1 can be adjusted to a desired position. In this case, displacement of the focus movement unit may be in proportion to the amount of focus movement of the reference light Lb1. Here, displacement of the focus movement unit may refer to displacement of the actuating lens 33 of the beam expander 32.

Figure 11:
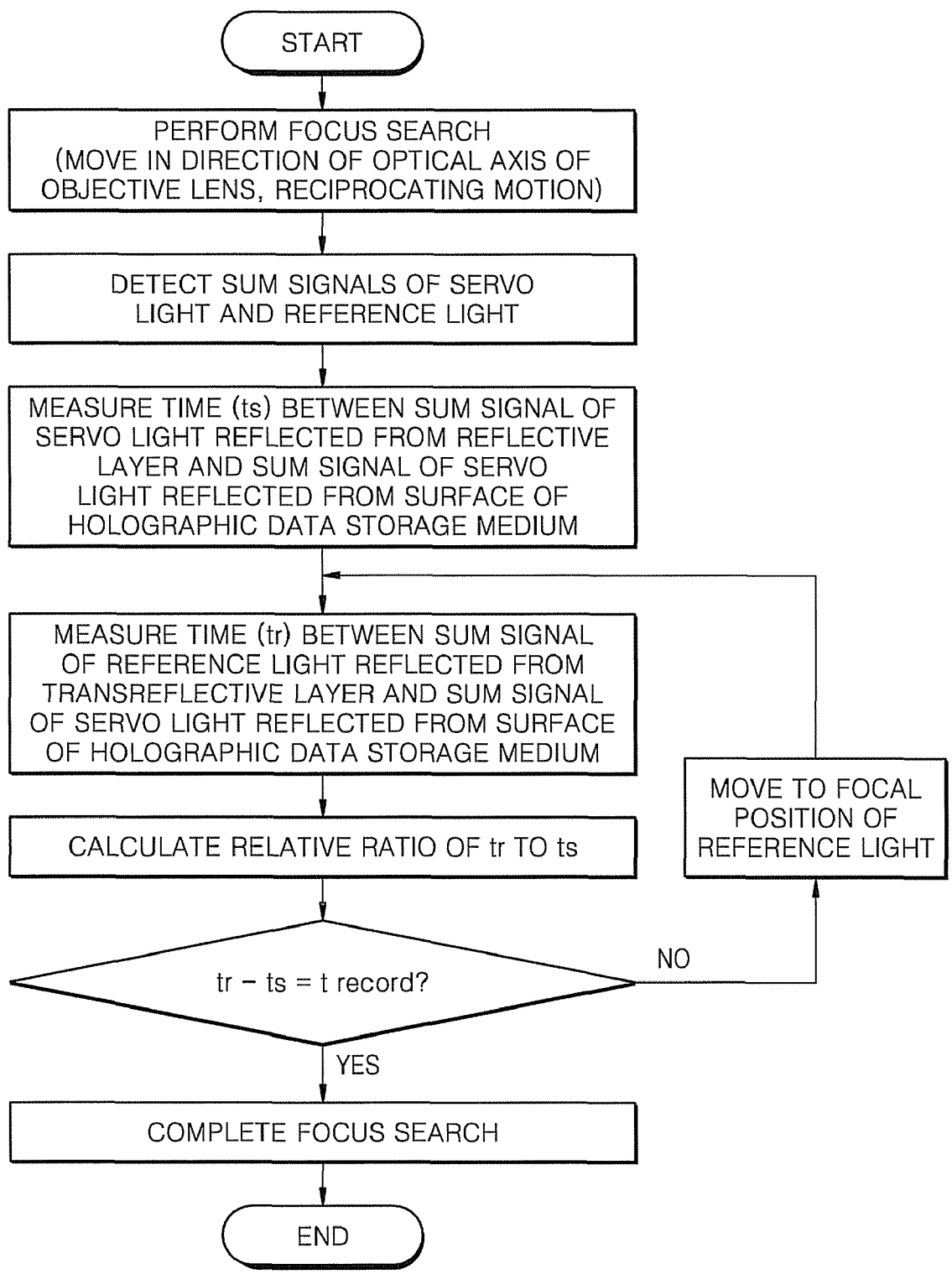
FIG. 11 is a flowchart of a method of adjusting a position of a recording layer, according to an embodiment of the present invention.

A more specific example of the method of adjusting the position of the recording layer according to an embodiment of the present invention will now be described with reference to the drawings. FIG. 11 is a flowchart schematically illustrating a method of adjusting a position of a recording layer, according to an embodiment of the present invention.

Figure 12:
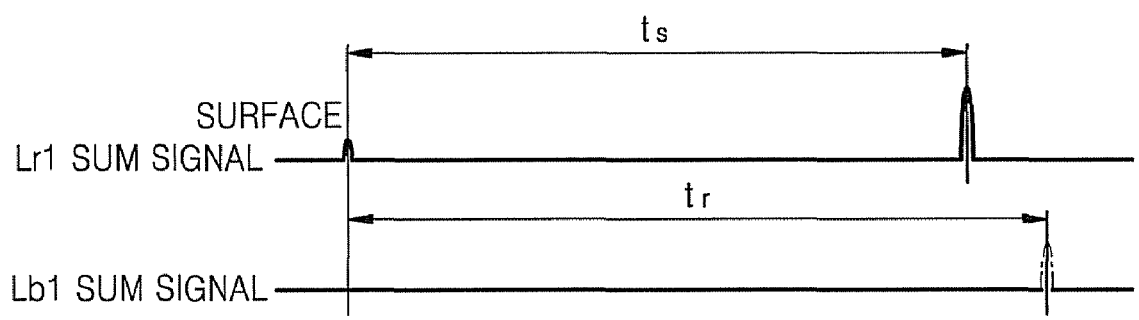
FIG. 12 illustrates a sum signal that is generated by adding a servo light and a reference light when an objective lens is focus searched, according to an embodiment of the present invention.

Referring to FIG. 11, in order to position the focus Fb of the reference light Lb1 in a position of a desired recording layer, first, the objective lens 100 is focus searched as the driving unit 44 is driven. The objective lens 100 is focus searched while making a reciprocating motion in a direction of an optical axis. When the objective lens 100 is focus searched, a sum signal of a servo light Lr1 and a reference light Lb1 is generated, as illustrated in FIG. 12. A time interval between a sum signal of the servo light Lr1 generated from the reflective layer 11 and a sum signal of the servo light Lr1 generated from the surface of the holographic data storage medium 10, and a time interval between a sum signal of the reference light Lb1 generated from the transreflective layer 12 and the sum signal of the servo light Lr1 generated from the surface of the holographic data storage medium 10 may be measured. In this case, the measured time intervals are set as ts and tr, respectively. When a distance ds between the surface of the holographic data storage medium 10 and the reflective layer 11 is 800 μm, ts may correspond to the thickness of 800 μm.

Aberration is not generated in the servo light Lr1 when a focus is formed on the reflective layer 11. Thus, the sum signal generated from the reflective layer 11 does not have spherical aberration. However, the sum signal generated by the servo light Lr2 reflected from the surface of the holographic data storage medium 10 is generated in the state in which spherical aberration corresponding to a distance between the surface of the holographic data storage medium 10 and the reflective layer 11 is generated. Compared to the focus forming position of the servo light Lr1 in the state in which spherical aberration is not generated, the focal position of the servo light Lr1 in the state in which spherical aberration is generated is changed by spherical aberration. Thus, the time interval ts between the sum signal generated from the surface of the holographic data storage medium 10 and the sum signal generated from the reflective layer 11 in the state in which spherical aberration is generated does not exactly coincide with the physical distance ds.

Errors generated by spherical aberration may be reduced using the following method. Since, for the servo light Lr1, the servo optical system 70 is optimized so that aberration in the reflective layer 11 is minimized, aberration on the surface of the holographic data storage medium 10 has spherical aberration W40 as shown in Equation 6 below, and as such, shift of the sum signal generated from the surface of the holographic data storage medium 10 occurs. A point where spherical aberration on the surface of the holographic data storage medium 10 is minimized is a point where a spherical aberration coefficient is the same as a defocus coefficient. An amount of shift generated by spherical aberration corresponds to the amount by which the servo light Lr1 is defocused, which can be determined by using Equation 7 below.

$$W_{40} = \frac{d}{8} \frac{n^2 - 1}{n^3} (NA)^4, \quad (6)$$

where n is a refractive index, and NA is a numerical aperture, and d is a change of thickness of the holographic data storage medium 10.

$$z = -2 W_{40}/(NA^2 \, Vact), \quad (7)$$

where z is the amount by which shift of the sum signal generated from the surface of the holographic data storage medium 10 occurs. Thus, when an error of the sum signal corresponding to an error caused by spherical aberration generated from the surface of the holographic data storage medium 10 by using Equation 7 with respect to measured ts is zr, the time interval ts may be corrected by zr to coincide with a physical thickness of the holographic data storage medium 10. Thus, tsc=ts+zr coincides with the physical thickness ds.

In addition, tr, which is an error caused by spherical aberration, may be corrected according to an error caused by spherical aberration. When an error generated by spherical aberration due to a distance difference between a focal position of the reference light Lb1 and the transreflective layer 13 is zb, tr may be corrected by zb as well as zr as trc=tr+zr+zb.

In Equation 7, Vact is a proceeding speed when the objective lens 44 reciprocatingly moves.

In order to check the current focal position of the reference light Lb1, Equation 8 may be used.

$$Rt = (tsc - trc) \times ds/tsc \quad (8)$$

When Rt is 0, the focus of the reference light Lb1 is positioned on the transreflective layer 12, and when Rt=⅛, the focus of the reference light Lb1 is positioned at a point 100 μm that is far away from the transreflective layer 12, i.e., at a point 600 μm that is far away from the surface of the holographic data storage medium 10. Thus, since Rt, zb, and zr for positioning the reference light Lb1 in a desired position are already known, when Rt that is calculated using the measured tr and ts is Rt,m, the reference light Lb1 may be positioned at a point where Rt and Rt,m coincide with each other. When a desired recording position is determined by a time term, trecord=tsc−trc.

By using the above method, the focus of the reference light Lb1 may be more precisely positioned in the desired recording position.

In FIG. 11, the position of the recording layer is searched by using ts and tr. This is just an example. Instead of this, the position of the recording layer can be adjusted by using tsc and trc, which are obtained by correcting spherical aberration elements, as described above.

Figure 13:
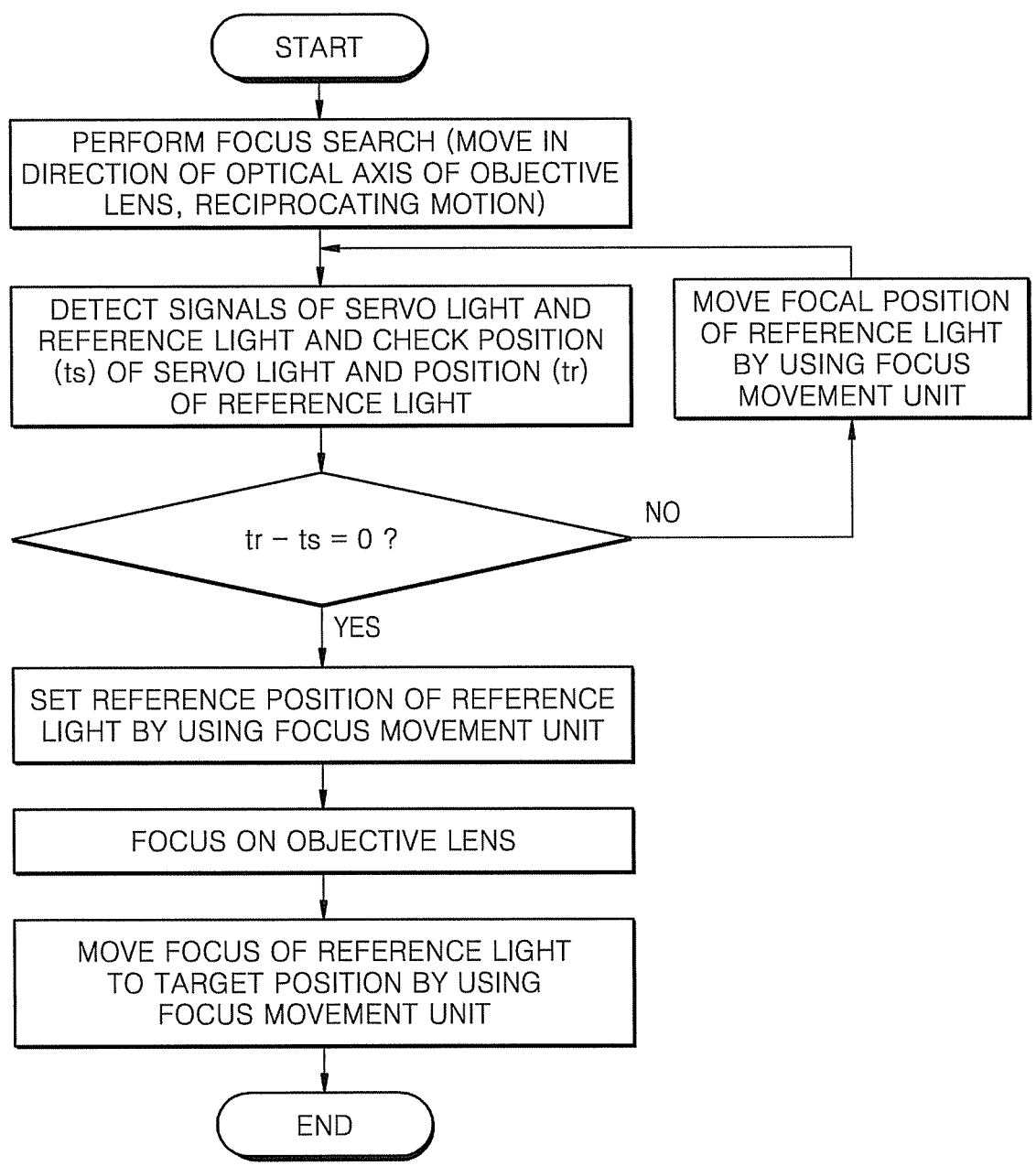
FIG. 13 is a flowchart of a method of adjusting a position of a recording layer, according to another embodiment of the present invention.

FIG. 13 is a flowchart of a method of adjusting a position of a recording layer, according to another embodiment of the present invention.

In order to set an initial target focal position of the reference light Lb1, in the state in which the objective lens 100 reciprocatingly moves in a direction of an optical axis, the actuating lens 33 of the beam expander 32 as a focus movement unit, which may move the focus of the reference light Lb1 so that a position ts of a first detection signal based on a reflective servo light Lr2 reflected from the reflective layer 11 is the same as a position tr of a second detection signal based on a reference light Lb3 reflected from the transreflective layer 12, is moved so that the focus of the reference light Lb1 is formed on the transreflective layer 12. This state is set as a reference position of the reference light Lb1 and is set as a reference position of the actuating lens 33 of the beam expander 32, and an initial reference focal position of the reference light Lb1 is set.

When the reference light Lb1 is positioned at the initial reference focus, the position of the focus movement unit of the reference light Lb1, i.e., the position of the actuating lens 33 of the beam expander 32 is set as a reference position.

The servo light Lr1 is focused on the reflective layer 11 using the objective lens 100. The actuating lens 33 moves by displacement corresponding to a target depth in the state where the servo light Lr1 is focused on the reflective layer 11 so that the focus of the reference light Lb1 is moved in the direction of the optical axis and the focus of the reference light Lb1 is formed in the target depth.

Figure 14:
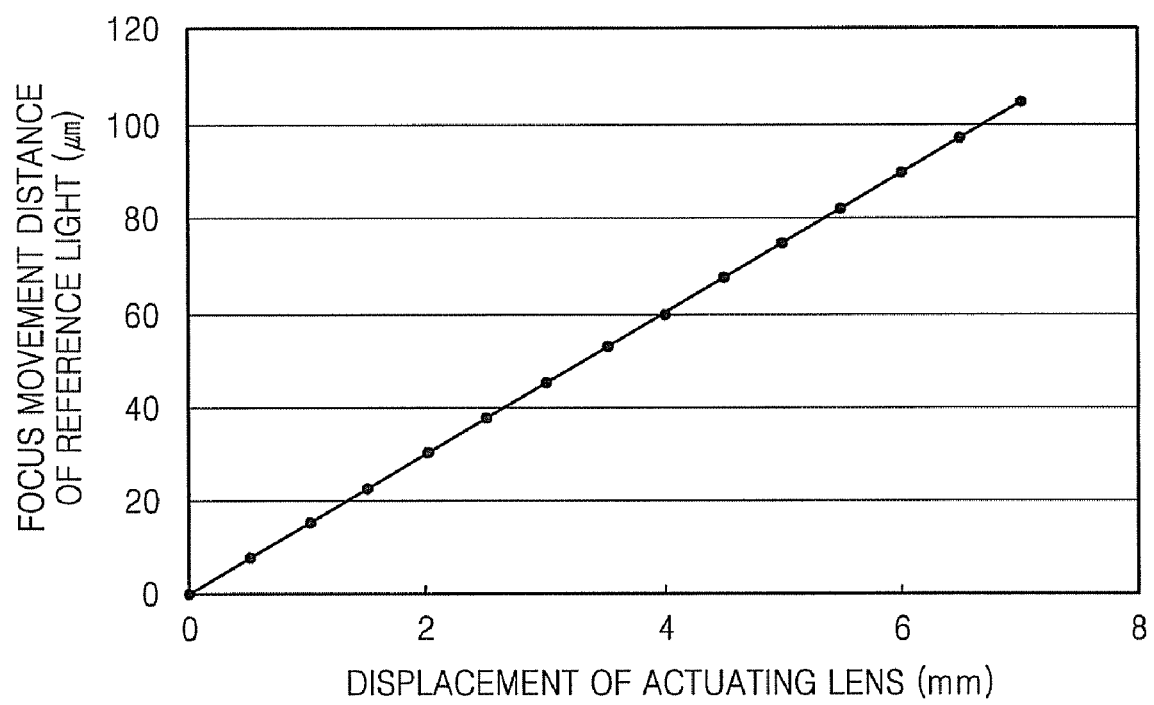
FIG. 14 is a graph illustrating the linear relationship between displacement of an actuating lens and a focus movement distance of a reference light in a holographic information data medium, according to an embodiment of the present invention.

Displacement of the actuating lens 33 and the focal movement distance of the reference light Lb1 in the holographic data storage medium 10 have a linear relationship, as illustrated in FIG. 14. For example, when the actuating lens 33 moves by 1 mm, the focus of the reference light Lb1 is moved by about 15 μm.

As described above, in the apparatus for recording/reproducing holographic data and the method of adjusting a position of a recording layer according to aspects of the present invention, position of an initial recording layer and a position of a desired recording layer can be effectively adjusted using a light signal reflected from a holographic data storage medium during recording.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus for recording/reproducing holographic data, in which a position of a recording layer in a holographic data storage medium is adjusted, the holographic data storage medium comprising a substrate, a first reflective layer from which a first light having a first wavelength is reflected, a second reflective layer from which a second light having a second wavelength is reflected, and a holographic medium layer on which holographic data is recorded, the second reflective layer being adjacent to the holographic medium layer, and the first reflective layer is disposed to be closer to or farther away from a side on which light is incident than the second reflective layer, and a reflective layer of the first and second reflective layers that is disposed to be close to the side on which light is incident is a transreflective layer through which light having one wavelength of the first and second lights having the first and second wavelengths, is transmitted and from which light having another wavelength, is reflected, the apparatus comprising:
first and second light sources configured to emit the first and second lights, respectively;
an objective lens configured to condense the first and second lights on the holographic data storage medium;
a driving unit configured to drive the objective lens;
a focus movement unit to move a focus of the second light in a direction of an optical axis;
a first photodetector configured to detect the first light reflected from the holographic data storage medium and to generate a first detection signal;
a second photodetector configured to detect the second light reflected from the holographic data storage medium and to generate a second detection signal; and
a controller configured to control the apparatus for recording/reproducing holographic data to adjust a focal position of the second light in the holographic medium layer based on the first light,
wherein:
the controller is further configured to control the focus movement unit to move a focal position of the second light so that the focal position of the second light is adjusted to the position of a desired recording layer while the objective lens reciprocatingly moves in a direction of an optical axis, and
the focus movement unit is further configured to move a focus of the second light in the direction of the optical axis until a time difference between the time at which the first detection signal is generated when the first light is reflected from the first reflective layer and the time at which a second detection signal is generated when the second light is reflected from the second reflective layer equates to a value corresponding to a position of a desired recording layer.

2. The apparatus of claim 1, wherein:
the time difference between the times at which the first and second detection signals are generated corresponds to a difference between a first time interval ts and a second time interval time interval tr;
the first time interval is a time interval between the generation of the first detection signal from the first light reflected from the surface of the holographic data storage medium and the generation of the first detection signal from the first light reflected from the first reflective layer; and
the second time interval is a time interval in the generation of the second detection signal from the second light reflected from the second reflective layer based on the first detection signal of the first light reflected from the surface of the holographic data storage medium.

3. The apparatus of claim 2, wherein the time difference between the times at which the first and second detection signals are generated is obtained by correcting an error caused by spherical aberration of the first detection signal generated from the surface of the holographic data storage medium and an error caused by spherical aberration of the second detection signal generated according to a degree by which a desired recording position deviates from the second reflective layer.

4. The apparatus of claim 2, wherein:
when an error caused by spherical aberration of the first detection signal generated from the surface of the holographic data storage medium is zr and an error caused by spherical aberration due to separation between a focal position of the second light and the second reflective layer is zb:
a time interval tsc between the first detection signals that are obtained by correcting the error caused by spherical aberration satisfies tsc=ts+zr, and
a time interval trc of the second detection signal obtained by correcting the error caused by spherical aberration, based on the first detection signal of the first light reflected from the surface of the holographic data storage medium, satisfies trc=tr+zr+zb, and
zb,zr=−2 $W_{40}$/$NA^2$ Vact, where $W_{40}$ is a spherical aberration coefficient, Vact is a proceeding speed when an objective lens reciprocatingly moves, and NA is a numerical aperture of the objective lens.

5. The apparatus of claim 1, wherein, while the objective lens reciprocatingly moves in the direction of the optical axis, the controller is further configured to control the focus movement unit such that the focus movement unit moves the focus of the second light in the direction of the optical axis until a position of the first detection signal of the first light reflected from the first reflective layer is the same as a position of a second detection signal based on the second light reflected from the second reflective layer to move a focal position of the second light, the controller is further configured to set a reference position of the focus movement unit as a position at which the position of the first detection signal of the first light reflected from the first reflective layer is the same as the position of the second detection signal based on the second light reflected from the second reflective layer, the controller is further configured to control the first light to be focused on the first reflective layer via the objective lens, and the controller is further configured to control the focus movement unit to move by displacement from the reference position such that the focus of the second light is moved in the direction of the optical axis such that the focal position of the second light is adjusted to a desired position.

6. The apparatus of claim 5, wherein the displacement of the focus movement unit is in proportion to the amount of focus movement of the second light.

7. The apparatus of claim 1, wherein:
the first and second photodetectors comprise a plurality of light-receiving regions;
the first detection signal is a sum signal or a focus error signal of light-receiving signals of the first light detected by the first photodetector;
the second detection signal is a sum signal or a focus error signal of light-receiving signals of the second light detected by the second photodetector.

8. The apparatus of claim 1, wherein:
one light source of the first and second light sources is configured to emit a servo light; and
the other light source is configured to emit light to record or reproduce holographic data.

9. The apparatus of claim 8, wherein: while the apparatus operates in a recording mode:
a signal light and a reference light are divided from light emitted from the other light source; and the signal light is reflected from the second or first reflective layer, is focused at a focus, and the reference light is directly focused at the focus, thereby forming fine interference patterns are formed and recording holographic data; and
while the apparatus operates in a reproduction mode, a hologram recorded in the holographic medium layer is reproduced based on light emitted from the other light source.

10. The apparatus of claim 9, wherein, while the apparatus operates in the recording mode:
the signal light and the reference light are incident on the holographic data storage medium in first and second orthogonal circular polarization states;
the second reflective layer or the first reflective layer has a circular polarization separation function;
a signal light in the first circular polarization state is reflected from the second or first reflective layer; and
the reference light in the second circular polarization state is reflected in a partial region of the holographic data storage medium, or a portion of the reference light in the second circular polarization is reflected from overall regions of the holographic data storage medium.

11. A method of adjusting a position of a recording layer in a holographic data storage medium, the holographic data storage medium comprising a substrate, a first reflective layer from which a first light having a first wavelength is reflected, a second reflective layer from which a second light having a second wavelength is reflected, and a holographic medium layer on which holographic data is recorded, wherein the second reflective layer is adjacent to the holographic medium layer, the first reflective layer is disposed to be closer to or farther away from a side on which light is incident than the second reflective layer, and a reflective layer that is disposed to be closer to the side of the first and second reflective layers on which light is incident, is a transreflective layer through which light having one wavelength of the first and second lights having the first and second wavelengths is transmitted and from which light having another wavelength is reflected, the method comprising:

adjusting a focal position of the second light according to a first detection signal of a first light reflected from the first reflective layer and a second detection signal of a second light reflected from the second reflective layer; and
controlling a focus movement unit to move a focus of the second light so that the focal position of the second light is adjusted to the position of a desired recording layer while an objective lens focusing the first and second lights on the holographic data storage medium makes a reciprocating motion in a direction of an optical axis,
wherein the focus movement unit moves a focus of the second light in the direction of the optical axis until a time difference between a time at which a first detection signal is generated when the first light is reflected from the first reflective layer and a time at which a second detection signal is generated when the second light is reflected from the second reflective layer equates to a value corresponding to a position of a desired recording layer.

12. The method of claim 11, wherein:
the time difference between the first and second detection signals corresponds to a difference between a first time interval is and a second time interval tr; the first time interval is a time interval at which the first detection signal of the first light reflected from the surface of the holographic data storage medium and the generation of the first detection signal from the first light reflected from the first reflective layer is generated; and
the second time interval is a time interval at which the second detection signal of the second light reflected from the second reflective layer is detected based on the first detection signal of the first light reflected from the surface of the holographic data storage medium.

13. The method of claim 12, further comprising:
correcting an error caused by spherical aberration of the first detection signal generated from the surface of the holographic data storage medium and an error caused by spherical aberration of the second detection signal generated according to a degree by which a desired recording position deviates from the second reflective layer so as to obtain the time difference between the first and second detection signals.

14. The method of claim 12, wherein:
when an error caused by spherical aberration of the first detection signal generated from the surface of the holographic data storage medium is zr, and an error caused by spherical aberration due to separation between a focal position of the second light and the second reflective layer is zb,
a time interval tsc between the first detection signals that are obtained by correcting the error caused by spherical aberration, satisfies tsc=ts+zr; and
a time interval trc of the second detection signal obtained by correcting the error caused by spherical aberration, based on the first detection signal of the first light reflected from the surface of the holographic data storage medium, satisfies trc=tr+zr+zb; and
wherein zb,zr=$-2 W_{40}/NA^2$ Vact, where $W_{40}$ is a spherical aberration coefficient, Vact is a proceeding speed when an objective lens moves reciprocatingly, and NA is a numerical aperture of the objective lens.

15. The method of claim 1, further comprising:
while the objective lens reciprocatingly moves in the direction of the optical axis, controlling the focus movement unit to move a focal position of the second light until a position of the first detection signal of the first light reflected from the first reflective layer is the same as a position of a second detection signal based on the second light reflected from the second reflective layer;

setting a position at which the position of the first detection signal of the first light reflected from the first reflective layer is the same as the position of the second detection signal based on the second light reflected from the second reflective layer, as a reference position of the focus movement unit; and focusing the first light on the first reflective layer via the objective lens, moving the focus movement unit by displacement from the reference position and moving the focus of the second light in the direction of the optical axis to be adjusted to a desired position.

16. The method of claim 15, wherein the displacement of the focus movement unit is in proportion to the amount of focus movement of the second light.

17. An apparatus to record data to, or reproduce data from, a holographic data storage medium, the apparatus comprising:

a first light source configured to emit a first light; a second light source configured to emit a second light;

an objective lens configured to condense the first and second lights on the holographic data storage medium;

a focus movement unit configured to move a focus of the second light in a direction of an optical axis;

a first photodetector configured to:
  detect the first light reflected from a reflective layer of the holographic data storage medium; and
  generate a first detection signal based on the detection of the first light, the first detection signal comprising a sum signal of a plurality of first sub-signals detected in different sections of the first photodetector;

a second photodetector configured to;
  detect the second light reflected from a transreflective layer of the holographic data storage medium; and
  generate a second detection signal based on the second light the second detection signal comprising a sum signal of a plurality of second sub-signals detected in different sections of the second photodetector; and a controller configured to control the apparatus to adjust a focal position of the second light in a holographic medium layer of the holographic data storage medium on which holographic data is recorded, based on the first light, wherein:
  the controller is further configured to control the focus movement unit to move a focal position of the second unit to a position of a recording layer of the holographic data storage medium while the objective lens reciprocatingly moves in an optical axis direction, and the focus movement unit is further configured to move a focus of the second light in the direction of the optical axis until a time difference between a time at which the first detection signal is generated and a time at which one of the plurality of second detection signals is generated corresponds to the position of the recording layer of the holographic data storage medium.

* * * * *